United States Patent
Goden et al.

(10) Patent No.: US 12,468,051 B2
(45) Date of Patent: Nov. 11, 2025

(54) RADIATION DETECTOR, METHOD OF DRIVING THE RADIATION DETECTOR, AND RADIATION-IMAGE PICKUP SYSTEM WITH COMPARATORS AT DIFFERENT DISTANCES FROM CORRESPONDING PIXELS

(71) Applicant: CANON KABUSHIKI KAISHA, Tokyo (JP)

(72) Inventors: Tatsuhito Goden, Tokyo (JP); Takanori Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 172 days.

(21) Appl. No.: 18/530,720

(22) Filed: Dec. 6, 2023

(65) Prior Publication Data

US 2024/0201402 A1  Jun. 20, 2024

(30) Foreign Application Priority Data

Dec. 15, 2022 (JP) .................... 2022-200560

(51) Int. Cl.
  *G01T 1/17* (2006.01)
  *G01T 1/20* (2006.01)
  *G21H 1/06* (2006.01)

(52) U.S. Cl.
  CPC .......... *G01T 1/17* (2013.01); *G01T 1/20185* (2020.05); *G21H 1/06* (2013.01)

(58) Field of Classification Search
  CPC .......... G01T 1/17; G01T 1/20185; G21H 1/06
  See application file for complete search history.

(56) References Cited

U.S. PATENT DOCUMENTS

| | | | | |
|---|---|---|---|---|
| 4,900,929 A | * | 2/1990 | Haas | H04N 5/33 348/E5.079 |
| 7,504,636 B1 | * | 3/2009 | Baxter | G01T 1/17 250/370.07 |
| 10,024,979 B1 | * | 7/2018 | Viswanath | G01T 1/172 |
| 12,111,431 B2 | * | 10/2024 | Aoki | G01T 1/36 |
| 2003/0127599 A1 | * | 7/2003 | Numai | G01T 1/24 250/370.01 |

(Continued)

FOREIGN PATENT DOCUMENTS

| | | |
|---|---|---|
| JP | 5-72345 A | 3/1993 |
| JP | 2019-9823 A | 1/2019 |

*Primary Examiner* — Blake C Riddick
(74) *Attorney, Agent, or Firm* — VENABLE LLP

(57) ABSTRACT

A radiation detector includes a first pixel and a second pixel disposed in a same column, a first comparator connected with the first pixel via a first vertical signal line, and a second comparator connected with the second pixel via a second vertical signal line. A first distance from a conversion portion of the first pixel to the first vertical signal line is different from a second distance from a conversion portion of the second pixel to the second vertical signal line. The first comparator is configured to receive a first reference signal and compare the first reference signal with an output signal sent from the first pixel. The second comparator is configured to receive a second reference signal and compare the second reference signal with an output signal sent from the second pixel. The second reference signal is different from the first reference signal.

14 Claims, 19 Drawing Sheets

(56) References Cited

U.S. PATENT DOCUMENTS

| | | | |
|---|---|---|---|
| 2004/0239377 A1* | 12/2004 | Tumer | G01T 1/17 327/94 |
| 2007/0007463 A1* | 1/2007 | DeGeronimo | G01T 1/247 250/382 |
| 2010/0079611 A1 | 4/2010 | Suzuki et al. | |
| 2011/0121191 A1* | 5/2011 | Kappler | G01T 1/17 250/370.09 |
| 2011/0180714 A1* | 7/2011 | Okada | G01T 1/243 250/354.1 |
| 2012/0318989 A1* | 12/2012 | Park | H10F 39/803 250/366 |
| 2013/0009065 A1* | 1/2013 | Okada | G01T 1/20184 250/363.01 |
| 2013/0136233 A1* | 5/2013 | Okada | G01T 1/208 378/62 |
| 2014/0110567 A1* | 4/2014 | Du | G01T 1/2985 250/214 RC |
| 2015/0185333 A1* | 7/2015 | Cho | G01T 1/17 250/394 |
| 2015/0234082 A1* | 8/2015 | Stoian | G01V 5/22 250/336.1 |
| 2016/0349380 A1* | 12/2016 | Shirahama | G01T 1/17 |
| 2017/0041559 A1* | 2/2017 | Kawaguchi | H04N 25/78 |
| 2017/0223317 A1* | 8/2017 | Matsumoto | H04N 25/616 |
| 2017/0372168 A1* | 12/2017 | Kobayashi | G06T 1/20 |
| 2018/0203133 A1* | 7/2018 | Farsoni | G01T 1/36 |
| 2018/0217271 A1* | 8/2018 | Cho | G01T 1/18 |
| 2019/0056515 A1* | 2/2019 | Kobayashi | G01T 1/20 |
| 2019/0154850 A1 | 5/2019 | Nishihara et al. | |
| 2020/0033482 A1* | 1/2020 | Negishi | G01J 1/4228 |
| 2021/0112211 A1* | 4/2021 | Kumagai | H04N 25/78 |
| 2021/0120200 A1* | 4/2021 | Kang | H04N 25/772 |
| 2021/0401387 A1* | 12/2021 | Hupfer | A61B 6/4241 |
| 2022/0221596 A1* | 7/2022 | Ullberg | G01T 1/247 |
| 2022/0334274 A1* | 10/2022 | Cao | A61B 6/032 |
| 2023/0247324 A1* | 8/2023 | Yamashita | H04N 25/77 348/297 |
| 2023/0280483 A1* | 9/2023 | Liu | G21K 1/043 378/98.8 |
| 2023/0341568 A1 | 10/2023 | Wada et al. | |
| 2023/0375722 A1 | 11/2023 | Osawa et al. | |
| 2023/0378228 A1 | 11/2023 | Osawa et al. | |
| 2024/0045086 A1* | 2/2024 | Cao | A61B 6/4233 |
| 2025/0089384 A1* | 3/2025 | Nakamura | H10F 39/1538 |
| 2025/0113120 A1* | 4/2025 | An | H04N 25/78 |
| 2025/0184628 A1* | 6/2025 | Berner | H04N 25/78 |
| 2025/0203245 A1* | 6/2025 | Johansson | H04N 25/618 |

* cited by examiner

RADIATION DETECTOR, METHOD OF DRIVING THE RADIATION DETECTOR, AND RADIATION-IMAGE PICKUP SYSTEM WITH COMPARATORS AT DIFFERENT DISTANCES FROM CORRESPONDING PIXELS

BACKGROUND

Field

The present disclosure relates to a radiation detector, a method of driving the radiation detector, and a radiation-image pickup system.

Description of the Related Art

In the field of image pickup apparatuses, a known apparatus includes a plurality of pixels arranged two-dimensionally and AD conversion portions arranged in each column of pixels. Japanese Patent Application Publication No. 2019-9823 discloses an image pickup apparatus in which the gain of an AD conversion portion can be adjusted, for example, in accordance with the sensitivity of each of photoelectric conversion portions of green, blue, and red. For changing the gain of a digital image signal in accordance with the sensitivity of the photoelectric conversion portion, the technique described in Japanese Patent Application Publication No. 2019-9823 changes the slope of a ramp signal used as a reference signal of the AD conversion portion.

By the way, it is known that the radiation, which includes the high-energy electromagnetic wave such as X rays and particle rays, can be detected by a detector that has a pixel structure of the CMOS image sensor.

The radiation detector detects the radiation, and outputs a detection result (e.g., the number of radiations counted by the radiation detector) as a digital signal. However, it has been found that the accuracy of the digital signal, which is outputted as a detection result may deteriorate as the radiation detector is used more.

Thus, it has been desired to achieve a technique that can reduce the deterioration of accuracy of the digital signal, which is outputted as a detection result by the radiation detector.

SUMMARY

According to a first aspect of the present disclosure, a radiation detector includes a plurality of pixels disposed in a pixel area and including a first pixel and a second pixel disposed in a same column, the plurality of pixels being disposed in a matrix and each of the plurality of pixels including a conversion portion configured to directly convert radiation to electric charge, a first comparator connected with the first pixel via a first vertical signal line, and a second comparator connected with the second pixel via a second vertical signal line. A first distance from the conversion portion of the first pixel to the first vertical signal line is different from a second distance from the conversion portion of the second pixel to the second vertical signal line. The first comparator is configured to receive a first reference signal and compare the first reference signal with an output signal sent from the first pixel to the first comparator via the first vertical signal line. The second comparator is configured to receive a second reference signal and compare the second reference signal with an output signal sent from the second pixel to the second comparator via the second vertical signal line, the second reference signal being different from the first reference signal. The radiation detector is configured to output a comparison result from each of the first comparator and the second comparator.

According to a second aspect of the present disclosure, a radiation detector includes a plurality of pixels disposed in a pixel area and including a first pixel and a second pixel disposed in a same column, the plurality of pixels being disposed in a matrix and each of the plurality of pixels including a conversion portion configured to directly convert radiation to electric charge and a transistor, a first comparator connected with the first pixel via a first vertical signal line, and a second comparator connected with the second pixel via a second vertical signal line. A first distance from the transistor of the first pixel to the first vertical signal line is different from a second distance from the transistor of the second pixel to the second vertical signal line. The first comparator is configured to receive a first reference signal and compare the first reference signal with an output signal sent from the first pixel to the first comparator via the first vertical signal line. The second comparator is configured to receive a second reference signal and compare the second reference signal with an output signal sent from the second pixel to the second comparator via the second vertical signal line, the second reference signal being different from the first reference signal. The radiation detector is configured to output a comparison result from each of the first comparator and the second comparator.

According to a third aspect of the present disclosure, a radiation detector includes a plurality of pixels disposed in a pixel area and including a first pixel and a second pixel disposed in a same column, the plurality of pixels being disposed in a matrix and each of the plurality of pixels including a conversion portion configured to directly convert radiation to electric charge and a transistor, a first comparator connected with the first pixel via a first vertical signal line, and a second comparator connected with the second pixel via a second vertical signal line. A distance from the pixel area to the first comparator in the first vertical signal line is different from a distance from the pixel area to the second comparator in the second vertical signal line. The first comparator is configured to receive a constant-voltage signal as a first reference signal and compare the first reference signal with an output signal sent from the first pixel to the first comparator via the first vertical signal line. The second comparator is configured to receive a constant-voltage signal as a second reference signal and compare the second reference signal with an output signal sent from the second pixel to the second comparator via the second vertical signal line, voltage of the second reference signal being different from voltage of the first reference signal. The radiation detector is configured to output a comparison result from each of the first comparator and the second comparator.

Further features of the present invention will become apparent from the following description of exemplary embodiments with reference to the attached drawings.

DESCRIPTION OF THE EMBODIMENTS

Figure 1:
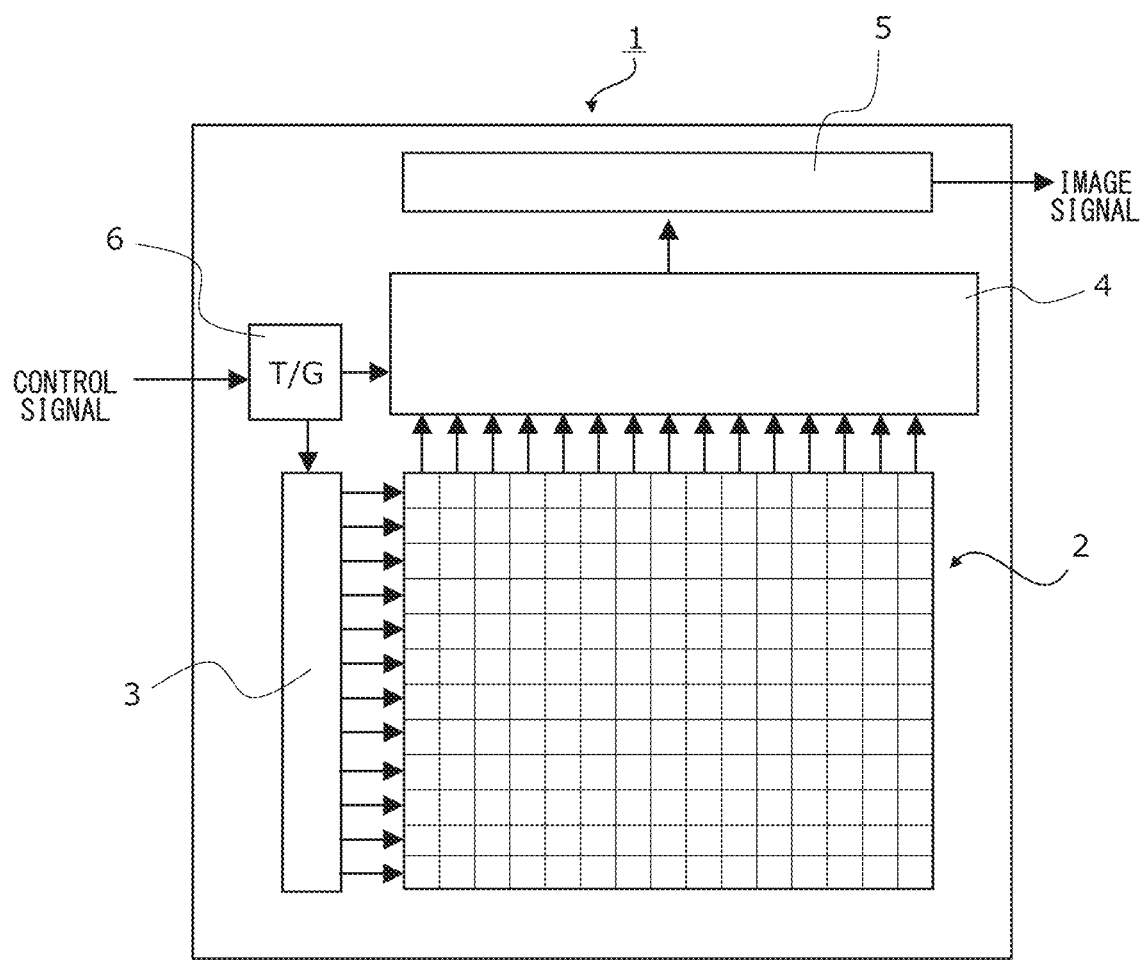
FIG. 1 is a schematic diagram illustrating a configuration of a radiation detector 1 of a first embodiment.

The present inventors have found the reason that the accuracy of the digital signal, outputted as a detection result, deteriorates in a radiation detector as the radiation detector is used more. First, the reason of the deterioration will be described.

In a radiation detection apparatus, a plurality of pixels that detects the radiation is arranged in a matrix, and vertical signal lines are disposed for each pixel column for transmitting an analog signal outputted from each pixel, to a corresponding A/D conversion circuit. For increasing the reading speed, in a configuration used, a plurality of vertical lines is disposed for each pixel column, and analog signals are read simultaneously from a plurality of pixel rows by using the plurality of vertical lines.

Each pixel is connected with any one of the plurality of vertical signal lines, and the vertical signal lines are separated from each other in a plan view. Thus, even if one pixel and another pixel are disposed in the same pixel column, the relative positional relationship between a component (e.g., a detection diode or a transistor) of each pixel and a vertical signal line connected with the pixel may vary, depending on which vertical signal line the pixel is connected with. In addition, even if one pixel and another pixel are disposed in the same pixel column, the length and position of a connection line that connects each pixel and a corresponding vertical signal line may vary, depending on which vertical signal line the pixel is connected with. In addition, even if one pixel and another pixel are disposed in the same pixel column, the shape of an insulation layer formed in the vicinity of each pixel, a corresponding connection line, and a corresponding vertical signal line may vary, depending on which vertical signal line the pixel is connected with.

In the radiation detector, if a radiation enters an insulation layer, an electric charge is produced in the insulation layer, and held in the insulation layer. The electric charge produced in the insulation layer changes, depending on the amount of radiation that enters the insulation layer. In addition to this, the electric charge also changes, depending on the intensity of electric field that is being applied to the insulation layer when the radiation enters the insulation layer.

The electric charge held in the insulation layer affects the operation of a detection portion and a transistor that constitute a pixel, and fluctuates the level of the analog signal (detection signal) outputted from the pixel. For example, the electric charge held in the insulation layer fluctuates the electric potential of a channel of the transistor included in the pixel, and shifts a threshold value. In this case, the operating point of the transistor included in the pixel may fluctuate. In another case, the electric charge held in the insulation layer may change the driving power of the transistor. In another case, the electric charge held in the insulation layer may change the width of a depletion layer of a PN junction (such as a junction between a source and a drain) of the transistor included in the pixel, possibly fluctuating the parasitic capacitance and increasing the leak current. Furthermore, the electric charge held in the insulation layer affects the electric potential of a diode that detects the radiation, increases the dark current, and fluctuates the parasitic capacitance.

In the following description, the phenomenon in which the level of the analog signal (detection signal) outputted from a pixel is fluctuated by the emission of radiation is referred to as sensor deterioration, for convenience of description. The sensor deterioration caused by the radiation is also caused, in addition to the above-described electric charge held in the insulating film, by the increase in the interface state caused by the total ionizing dose effect and the Displacement Damage Dose Effect. The amount of increase in the interface state, caused by the emission of radiation, depends on the electric field that is being applied in the vicinity of the interface in the emission of radiation. Since the interface state increases as the electric field applied in the vicinity of the interface increases, the sensor deterioration increases. If the sensor deterioration is caused by the radiation, the accuracy of the digital signal, outputted as a detection result, will deteriorate.

Next, some embodiments of the present disclosure will be described with reference to the accompanying drawings. Even if the sensor deterioration is caused by the radiation, the fluctuation of the digital output signal is reduced by appropriately performing an A/D conversion process, depending on which vertical signal line the pixel (that outputs an analog signal) is connected.

Note that since the below-described embodiments are examples, a detailed configuration and the like can be modified appropriately by a person skilled in the art without departing the spirit of the present disclosure. In addition, in the drawings referred to for describing the following embodiments, a component given an identical reference numeral has an identical function, unless otherwise specified. In addition, if a plurality of identical components is illustrated in a diagram, the symbols and the description for the components may be omitted.

In addition, a diagram may be illustrated schematically for convenience of illustration and description. Thus, the shape, size, arrangement, and the like of components illustrated in a diagram may not necessarily be exactly equal to those of real components. In the description for the two-dimensional arrangement of pixels described with reference to a diagram, a row means a line in which components are arranged in a lateral direction in the diagram, and a column means a line in which components are arranged in a longitudinal direction in the diagram.

First Embodiment

Configuration

A radiation detector of a first embodiment will be described with reference to FIGS. 1 to 14.

FIG. 1 is a schematic diagram illustrating a configuration of a radiation detector 1 of the first embodiment. The radiation detector 1 includes a pixel area 2, a vertical scanning circuit 3, a readout circuit 4, a signal output circuit 5, and a timing generator 6. In the pixel area 2, a plurality of pixels is arranged two-dimensionally. Each of the pixels accumulates the electric charge produced by the emission of radiation, and outputs a pixel signal that corresponds to the amount of accumulated electric charge. The vertical scanning circuit 3 outputs a control signal for sequentially selecting pixels of the pixel area 2 for each row. The readout circuit 4 includes A/D conversion circuits. The A/D conversion circuits will be described in detail below. In addition to the above-described components, the radiation detector 1 may include a column amplifier, a correlated double sampling (CDS) circuit, and an adding circuit.

In FIG. 1, pixel signals are read, via vertical signal lines (not illustrated), from pixels of a row selected by the vertical scanning circuit 3, and sent to the A/D conversion circuits of the readout circuit 4. A pixel signal received by a corresponding A/D conversion circuit is converted from an analog signal to a digital signal. The signal output circuit 5 receives the digital signal outputted from the A/D conversion circuit, and sends the digital signal to an external apparatus, as an image signal, by using a predetermined method. The timing generator 6 receives a control signal sent from an external apparatus, and controls the operation of the vertical scanning circuit 3, the readout circuit 4, and the signal output circuit 5 by sending timing signals to the vertical scanning circuit 3, the readout circuit 4, and the signal output circuit 5.

Figure 2:
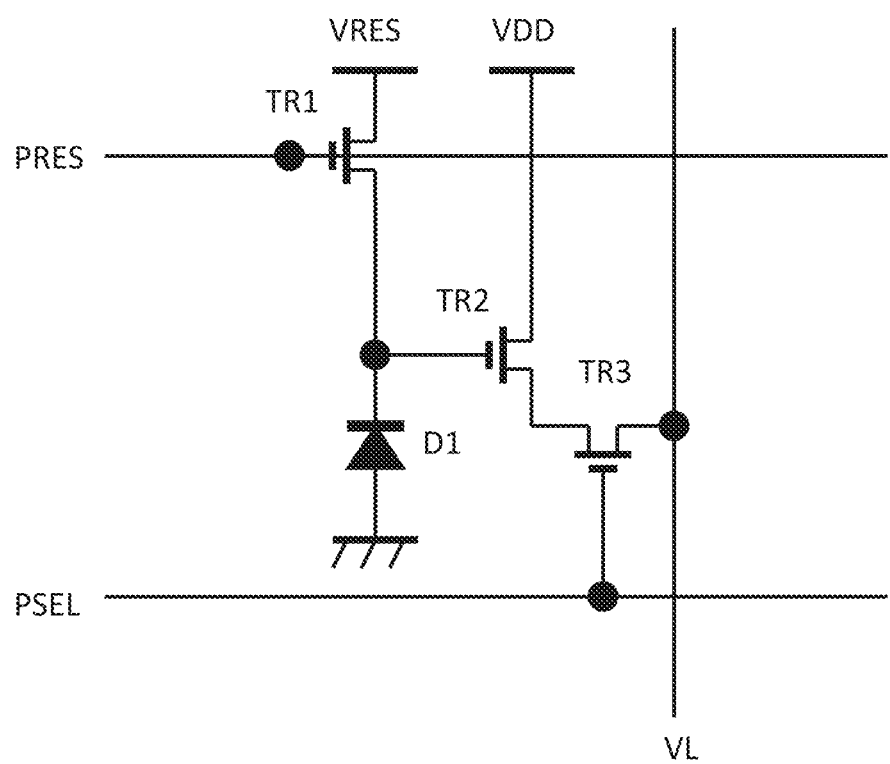
FIG. 2 is a circuit diagram illustrating an example of one pixel.

FIG. 2 is a circuit diagram of a pixel for describing a configuration of each of the plurality of pixels arranged in the pixel area 2. In this example, electric charges accumulated in a detection diode D1 that is a radiation detection element are electrons, and all of the transistors included in a pixel are N-type transistors. However, a detection diode that accumulates holes as electric charges may be used. In this case, transistors included in a pixel are P-type transistors. That is, the conductivity type may be changed as appropriate in accordance with the polarity of electric charges used as a signal. Thus, the electric potential of each of the gate, source, and drain of a transistor is changed as appropriate in accordance with the change in the conductivity type. For example, in a transistor that is operated as a switch, the low level and high level in the electric potential suppled to the gate are reversed in accordance with the change in the conductivity type.

Each pixel includes the detection diode D1, a reset transistor TR1, an amplification transistor TR2, and a selection transistor TR3. The detection diode D1 functions as a photoelectric conversion portion that converts the radiation to electric charges. Note that FIG. 2 illustrates one example of a pixel included in the radiation detector 1. Thus, the configuration of the pixel used in the present embodiment is not limited to this. For example, the pixel may include four transistors, and one of them may be a transfer transistor disposed between the detection diode D1 and the gate of the amplification transistor TR2. In another case, the pixel may have another configuration.

In the example of FIG. 2, the detection diode D1 is disposed in a semiconductor substrate, and the cathode of the detection diode D1 is connected to the source of the reset transistor TR1 and the gate of the amplification transistor TR2. The anode of the detection diode D1 is connected to a ground GND of the semiconductor substrate. The drain of the reset transistor TR1 is connected to a power supply voltage VRES, and the power supply voltage VRES can be applied to the cathode of the detection diode D1 via the reset transistor TR1. In addition, the drain of the amplification transistor TR2 is connected to a power supply voltage VDD. The power supply voltage VRES and the power supply voltage VDD may be equal to each other. The source of the amplification transistor TR2 is connected to a vertical signal line VL via the selection transistor TR3. A reset signal PRES is sent to the gate of the reset transistor TR1, and a selection signal PSEL is sent to the gate of the selection transistor TR3.

The vertical signal line VL is connected with a current source (not illustrated). If the level of the selection signal PSEL becomes an active level, the selection transistor TR3 turns ON. As a result, current is supplied from the current source to the amplification transistor TR2. The power supply voltage VDD, the amplification transistor TR2, and the current source connected to the vertical signal line VL form a source follower circuit. The formation of the source follower circuit allows the amplification transistor TR2 to output an analog signal, which is based on the electric potential of the cathode of the detection diode D1, to the vertical signal line VL via the selection transistor TR3.

Next, with reference to FIG. 3, the connection between the pixels included in the pixel area 2 and the A/D conversion circuits included in the readout circuit 4 will be described. For convenience of illustration and description, a pixel array of three columns and twelve rows is partly extracted from the pixel area 2 and described. However, the pixels of the other portion of the pixel area 2 are connected with corresponding A/D conversion circuits in the same manner.

Figure 3:
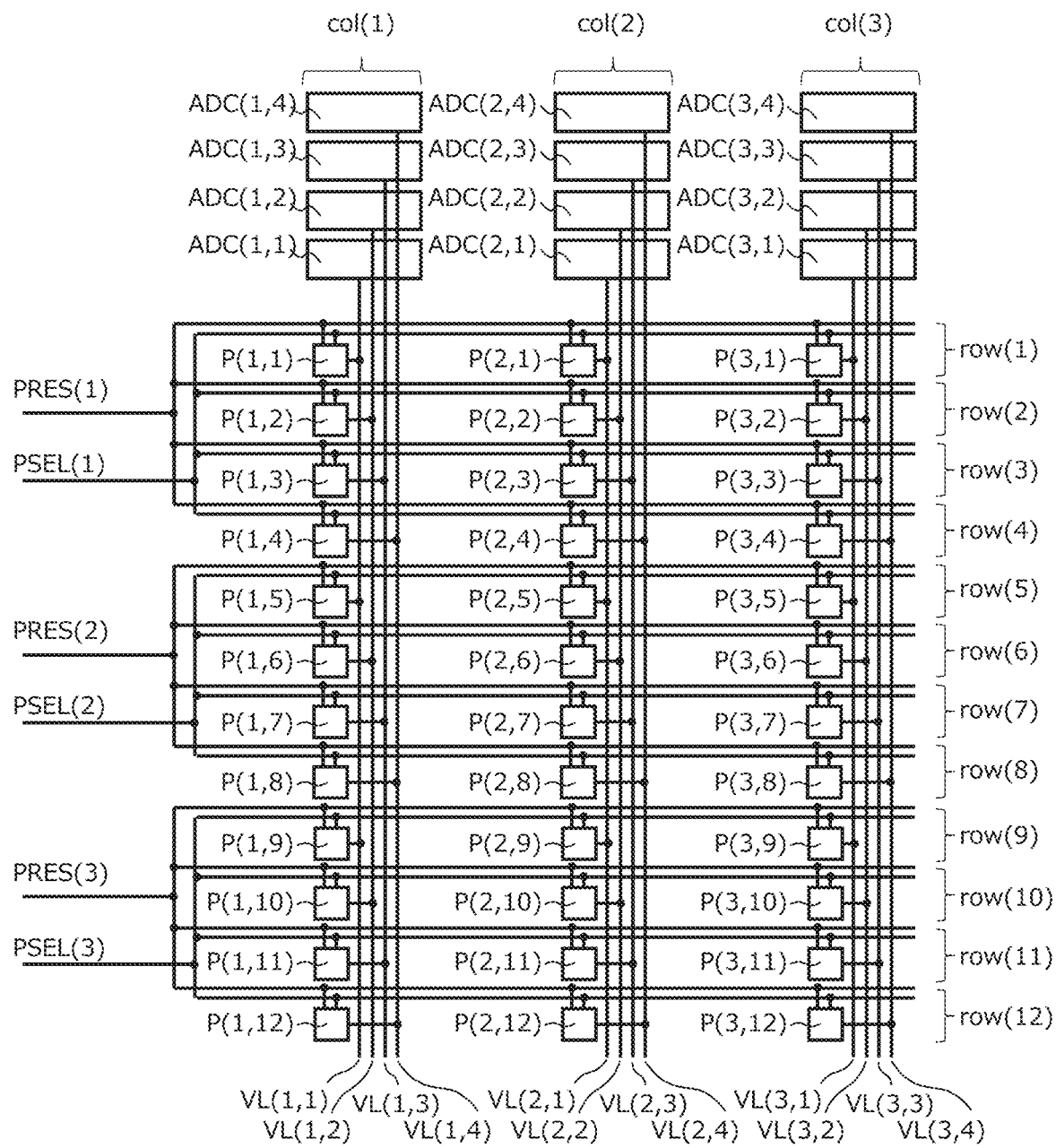
FIG. 3 is a diagram illustrating the connection between pixels included in a pixel area and A/D conversion circuits included in a readout circuit.

In FIG. 3, each of the pixels arranged two-dimensionally in FIG. 1 is denoted by P(i,j). The symbol i denotes a column number, and the symbol j denotes a row number. FIG. 3 illustrates an example of a pixel group in which the column number i is in a range from 1 to 3 and the row number j is in a range from 1 to 12. Each column of the pixel array is illustrated as one of a first column col(1), a second column col(2), and a third column col(3). In addition, each row of the pixel array is illustrated as one of a first row row(1), a second row row(2), a third row row(3), a fourth row row(4), a fifth row row(5), a sixth row row(6), a seventh row row(7), an eighth row row(8), a ninth row row(9), a tenth row row(10), an eleventh row row(11), and a twelfth row row(12).

The pixel P(i,j) having a column number i of 1 to 3 and a row number j of 1 to 12 is provided with any one of a selection signal PSEL(1), a selection signal PSEL(2), and a selection signal PSEL(3) and with any one of a reset signal PRES(1), a reset signal PRES(2), and a reset signal PRES(3) from the vertical scanning circuit 3.

That is, the selection signal PSEL(1) and the reset signal PRES(1) are both provided to pixels of the first row row(1), the second row row(2), the third row row(3), and the fourth row row(4). The selection signal PSEL(2) and the reset signal PRES(2) are both provided to pixels of the fifth row row(5), the sixth row row(6), the seventh row row(7), and the eighth row row(8). The selection signal PSEL(3) and the reset signal PRES(3) are both provided to pixels of the ninth row row(9), the tenth row row(10), the eleventh row row (11), and the twelfth row row(12). The path of each of the selection signals PSEL(1) to PSEL(3) branches to paths of corresponding rows, so that each of the selection signals PSEL(1) to PSEL(3) is supplied to the rows. Similarly, the path of each of the reset signals PRES(1) to PRES(3) branches to paths of corresponding rows, so that each of the reset signals PRES(1) to PRES(3) is supplied to the rows. In this case, a repeat buffer (not illustrated) may be disposed in the branched path of each row for reducing the delay of signal.

For each column of pixels, four vertical signal lines and four A/D conversion circuits are disposed. An A/D conversion circuit is denoted by ADC(i,k) and a vertical signal line is denoted by VL(i,k), where the symbol i is a column number and the symbol k is the number of a vertical signal line disposed for each pixel column. In the example of FIG. 3, the column number i is in a range from 1 to 3 and the number of a vertical signal line is in a range from 1 to 4. A vertical signal line VL(i,k) is connected to an A/D conversion circuit ADC(i,k).

A pixel signal from a pixel P(i,1), a pixel P(i,5), or a pixel P(1,9) is sent to an A/D conversion circuit ADC(i, 1) via a vertical signal line VL(i,1). A pixel signal from a pixel P(i,2), a pixel P(i,6), or a pixel P(i, 10) is sent to an A/D conversion circuit ADC(i,2) via a vertical signal line VL(1, 2). A pixel signal from a pixel P(i,3), a pixel P(i,7), or a pixel P(i.11) is sent to an A/D conversion circuit ADC(1,3) via a vertical signal line VL(1,3). A pixel signal from a pixel P(i,4), a pixel P(i,8), or a pixel P(i,12) is sent to an A/D conversion circuit ADC(i,4) via a vertical signal line VL(i, 4).

In such a configuration, the reading operation can be performed on the pixels arranged in a matrix such that pixels of four rows are collectively read at a time. Thus, pixel signals from four rows can be simultaneously sent to the A/D conversion circuits. In addition, the A/D conversion circuits ADC(i,k) can convert the pixel signals from four rows, simultaneously from analog signals to digital signals. As a result, the speed of the reading operation can be increased.

Pixel Layout

Figure 4:
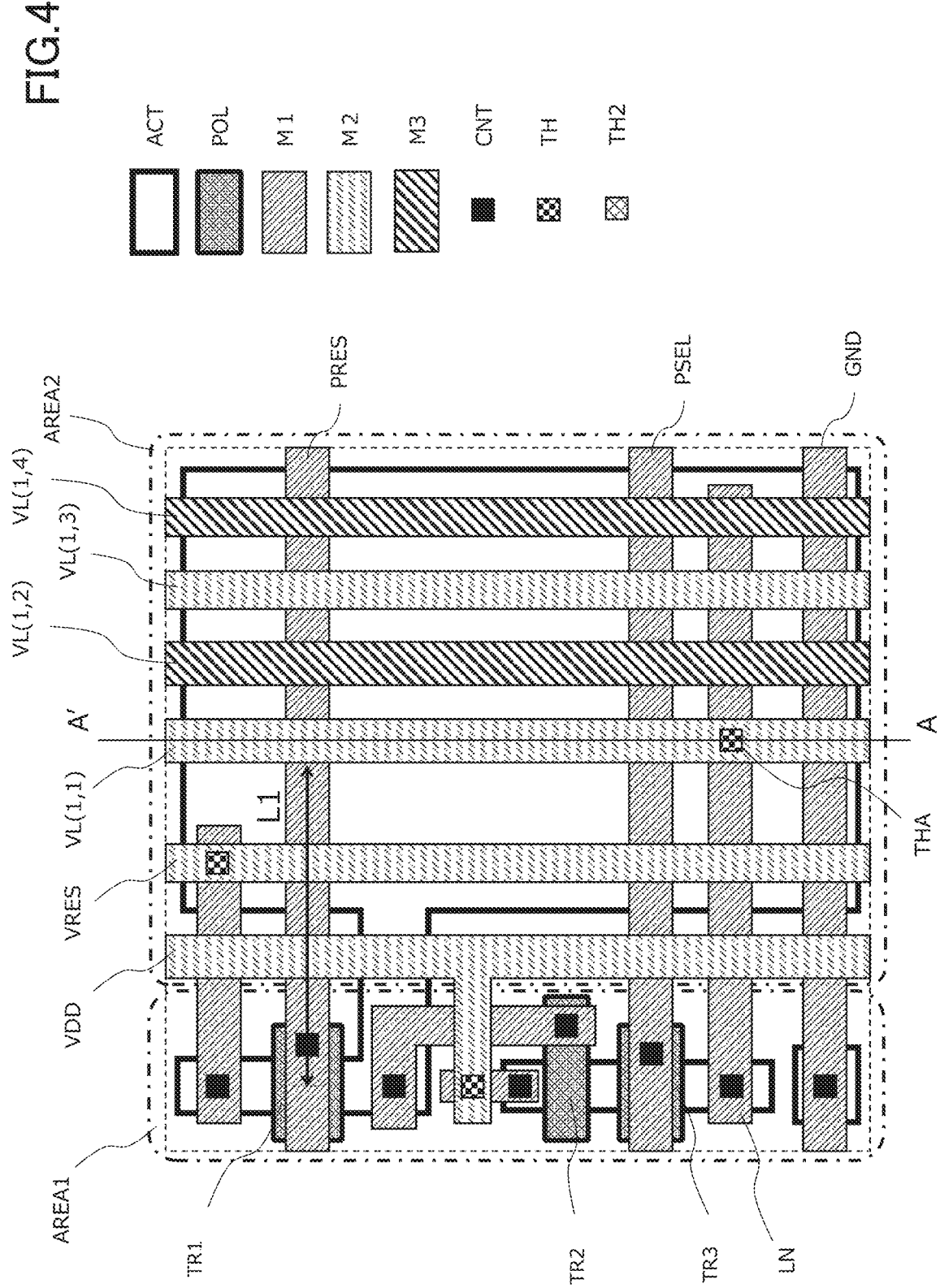
FIG. 4 is a diagram illustrating a first pixel layout in which components of a pixel and vertical signal lines are arranged on a semiconductor substrate.

Next, a layout of components of a pixel and vertical signal lines will be described. First, a first pixel layout will be described with reference to FIG. 4. FIG. 4 is a diagram illustrating a layout of components of a pixel and vertical signal lines formed on a semiconductor substrate. The pixel is one of the pixel P(1,1), the pixel P(1,5), and the pixel P(1,9), which are illustrated in FIG. 3. In FIG. 4, the pixel includes an active layer ACT of the semiconductor. In the active layer ACT, the source, the drain, and the channel region of each of the reset transistor TR1, the amplification transistor TR2, and the selection transistor TR3, the detection diode D1, or a contact region connected with a well are formed. Outside the active layer ACT, an element separation layer made of silicon oxide is disposed. In addition, the pixel includes a polysilicon layer POL. In the polysilicon layer POL, the gate electrode of each of the reset transistor TR1, the amplification transistor TR2, and the selection transistor TR3, and lines are formed. In addition, the pixel includes a first metal layer M1, a second metal layer M2, and a third metal layer M3. Depths of the first metal layer M1, the second metal layer M2, and the third metal layer M3 are different from each other, and the metal layers M1 to M3 are used as lines. The pixel also includes a contact hole CNT. The contact hole CNT connects the active layer and the first metal layer, or connects the polysilicon layer and the first metal layer. The pixel also includes a first through hole TH that connects the first metal layer and the second metal layer. The pixel also includes a second through hole TH2 that connects the second metal layer and the third metal layer.

As illustrated in FIG. 4, the pixel includes an area AREA1 in which the reset transistor TR1, the amplification transistor TR2, and the selection transistor TR3 are disposed, and an area AREA2 in which the detection diode is disposed. In addition, in the area AREA2, vertical signal lines VL(1,1), VL(1,2), VL(1,3), and VL(1,4) are disposed. The radiation can pass through a metal layer. Thus, even if lines such as vertical signal lines are disposed above the detection diode, the detection diode can detect the radiation.

The vertical signal lines VL(1,1) and VL(1,3) are formed by the second metal layer M2, and the vertical signal lines VL(1,2) and VL(1,4) are formed by the third metal layer M3. Since vertical signal lines adjacent to each other are formed by different metal layers, the space between the lines and the width of each line can be increased. As a result, the break of a line and the short circuit between the lines can be suppressed, and the yield can be increased. In the present embodiment, the second metal layer M2 and the third metal layer M3 are used as metal layers that form the vertical signal lines. However, since the vertical signal lines have only to be formed by different metal layers, other metal layers, such as a fourth metal layer and a fifth metal layer, may be added and disposed.

Figure 5:
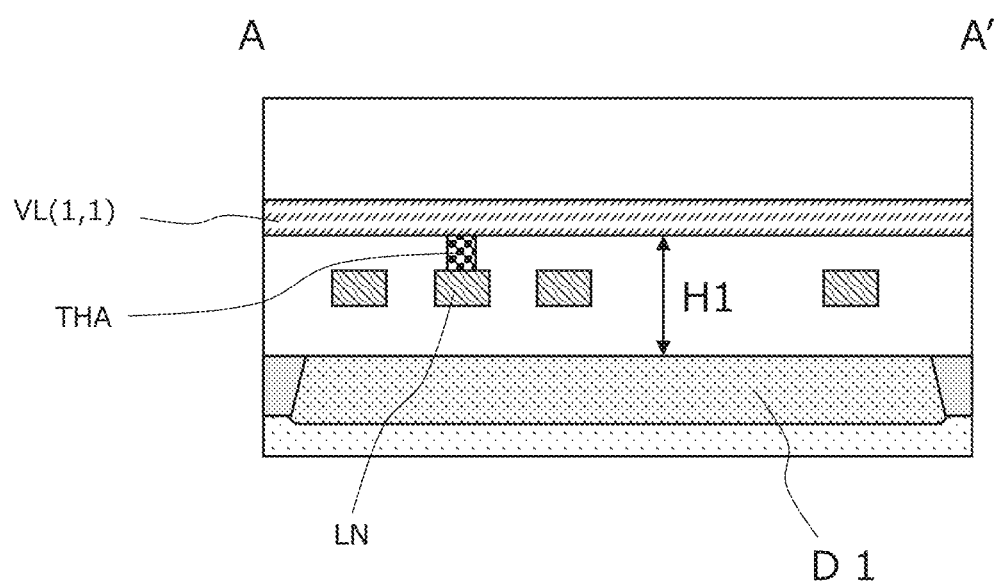
FIG. 5 is a cross-sectional view illustrating a cross section taken along an A-A line of FIG. 4.

FIG. 5 is a cross-sectional view illustrating a cross section of the semiconductor substrate, taken along an A-A' line of FIG. 4. As illustrated in FIG. 5, the drain of the selection transistor TR3 is connected with the vertical signal line VL(1,1) via a leading line LN and a first through hole THA. The leading line LN is formed by the first metal layer M1. In addition, a line of the power supply voltage VRES connected with the reset transistor TR1, a line of the reset signal PRES connected with the reset transistor TR1, a line of the power supply voltage VDD connected with the amplification transistor TR2, a line of the selection signal PSEL connected with the selection transistor TR3, and a line that provides the GND potential to the well of the transistors are disposed.

Note that the area of the detection diode is defined by the active layer in the present embodiment. However, the area of the detection diode may be defined by a semiconductor region that has the same conductivity type as that of the well of the transistors. Preferably, the leading line LN is disposed so as to overlap with the vertical signal line VL(1,2), the vertical signal line VL(1,3), and the vertical signal line VL(1,4). In such arrangement, it is possible to easily form a layout of a pixel in which the selection transistor TR3 is connected to the vertical signal line VL(1,2), the vertical signal line VL(1,3), or the vertical signal line VL(1,4), as described below. That is, the above-described pixel can be formed by only changing the metal layer and the through hole, without changing the arrangement of the transistors and the detection diode.

Figure 6:
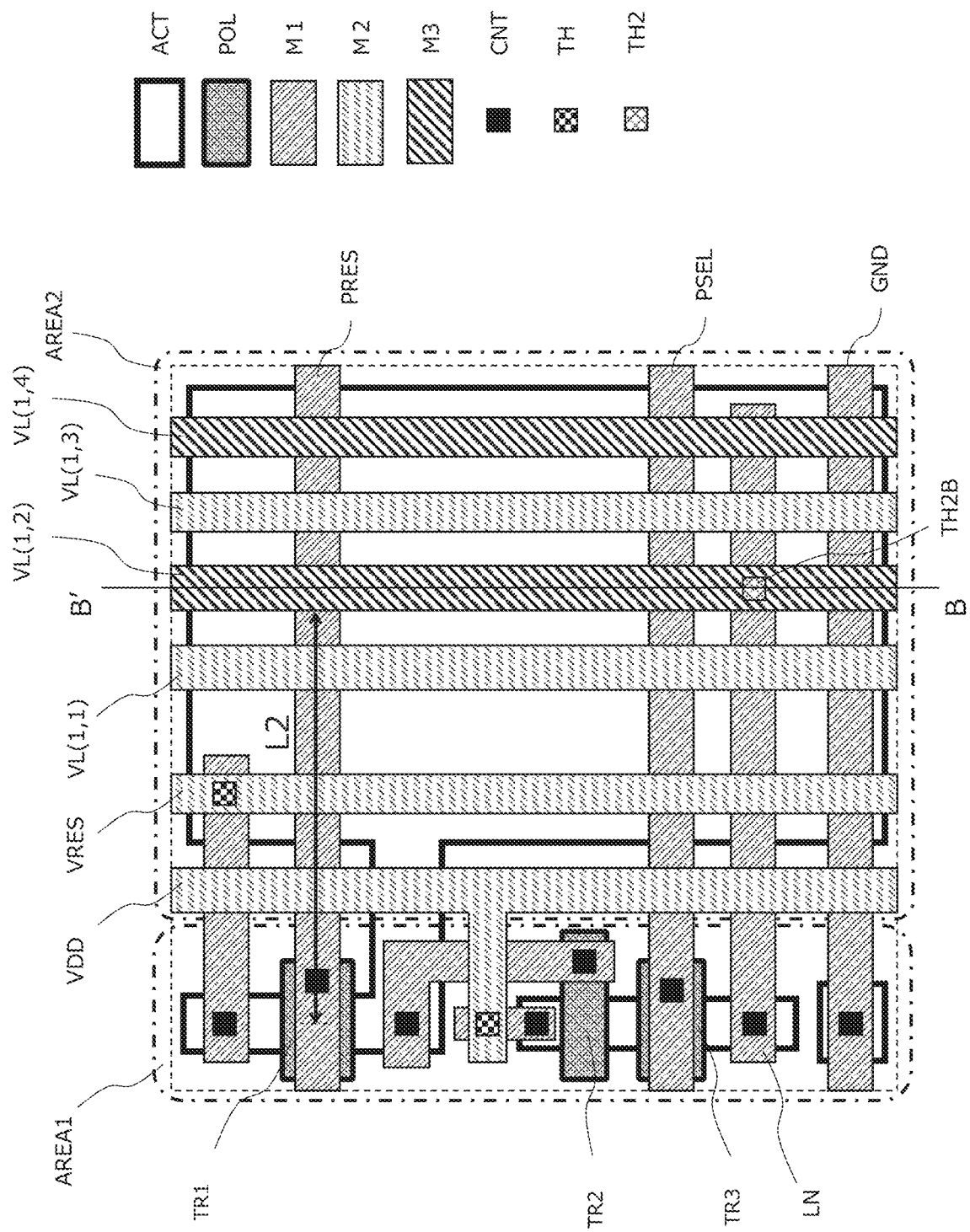
FIG. 6 is a diagram illustrating a second pixel layout in which components of a pixel and vertical signal lines are arranged on a semiconductor substrate.

Next, a second pixel layout illustrated in FIG. 6 will be described. FIG. 6 illustrates a layout of the pixel P(1,2), the pixel P(1,6), or the pixel P(1,10). In any one of the pixels, the selection transistor TR3 is connected with the vertical signal line VL(1,2).

Figure 7:
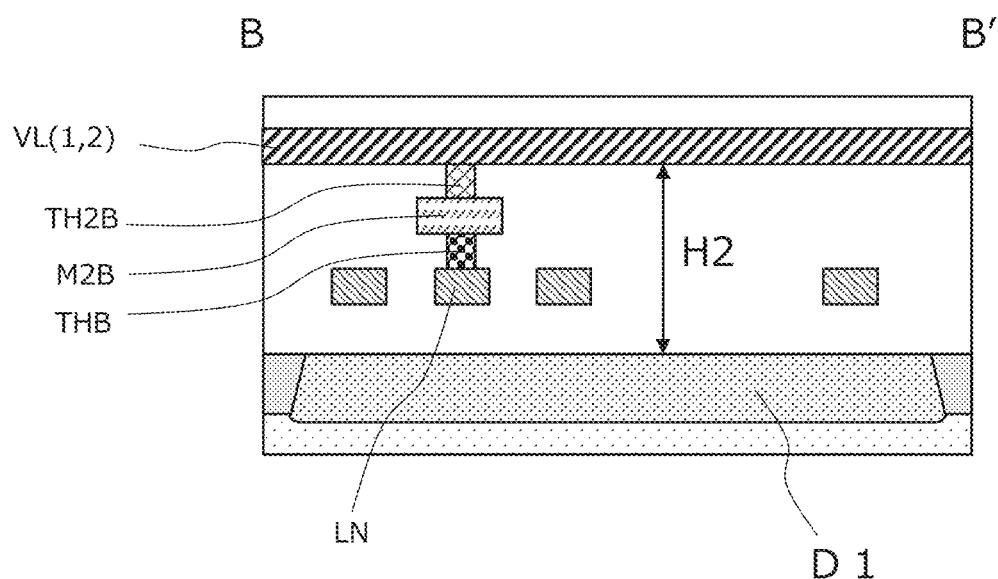
FIG. 7 is a cross-sectional view illustrating a cross section taken along a B-B' line of FIG. 6.

FIG. 7 is a cross-sectional view illustrating a cross section of the semiconductor substrate, taken along a B-B' line of FIG. 6. The drain of the selection transistor TR3 is connected with a second metal layer M2B via a leading line LN and a first through hole THB, and with the vertical signal line VL(1,2) via a second through hole TH2B. The leading line LN is formed by the first metal layer M1.

Figure 8:
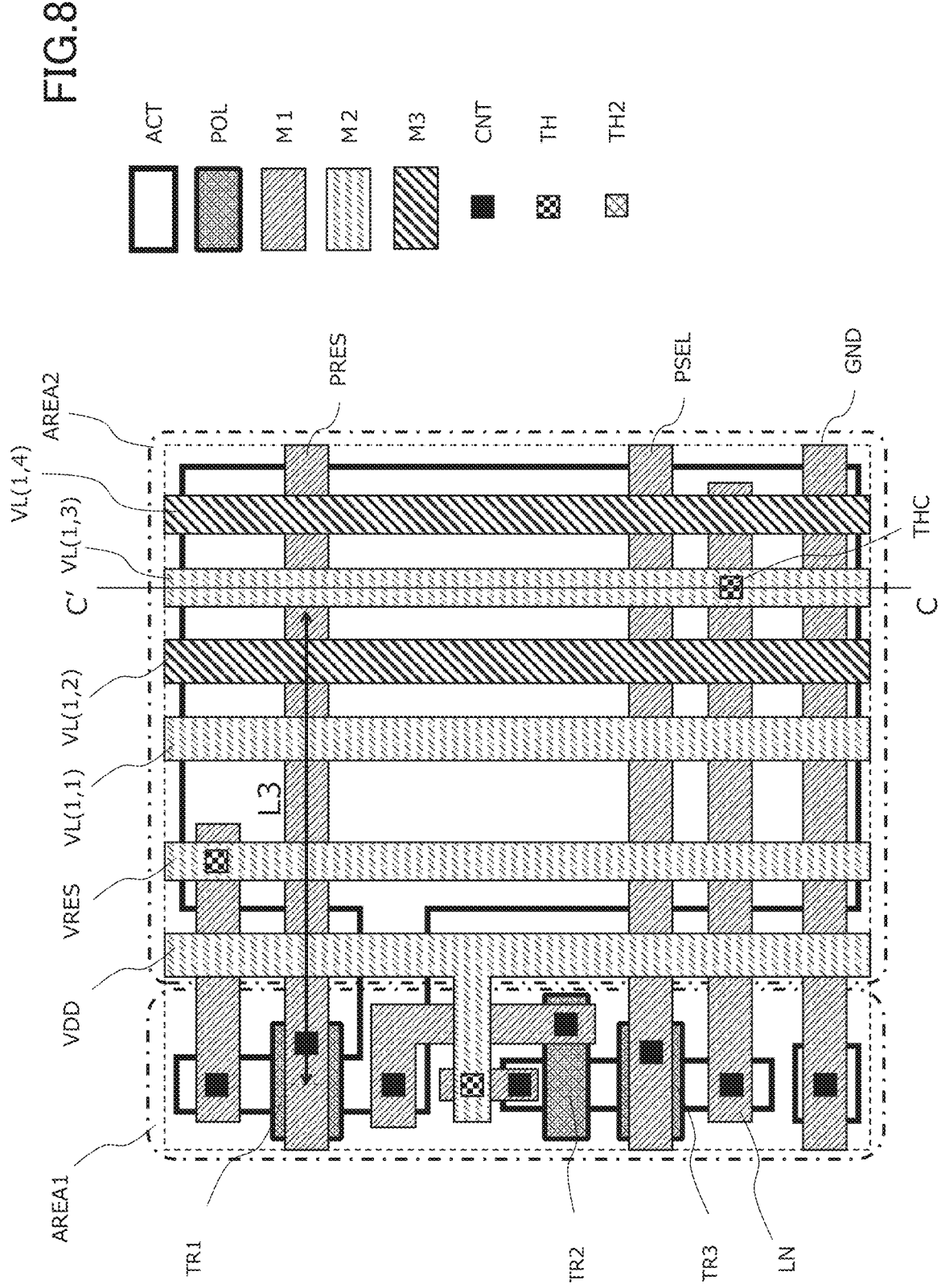
FIG. 8 is a diagram illustrating a third pixel layout in which components of a pixel and vertical signal lines are arranged on a semiconductor substrate.

Next, a third pixel layout illustrated in FIG. 8 will be described. FIG. 8 illustrates a layout of the pixel P(1,3), the pixel P(1,7), or the pixel P(1,11). In any one of the pixels, the selection transistor TR3 is connected with the vertical signal line VL(1,3).

Figure 9:
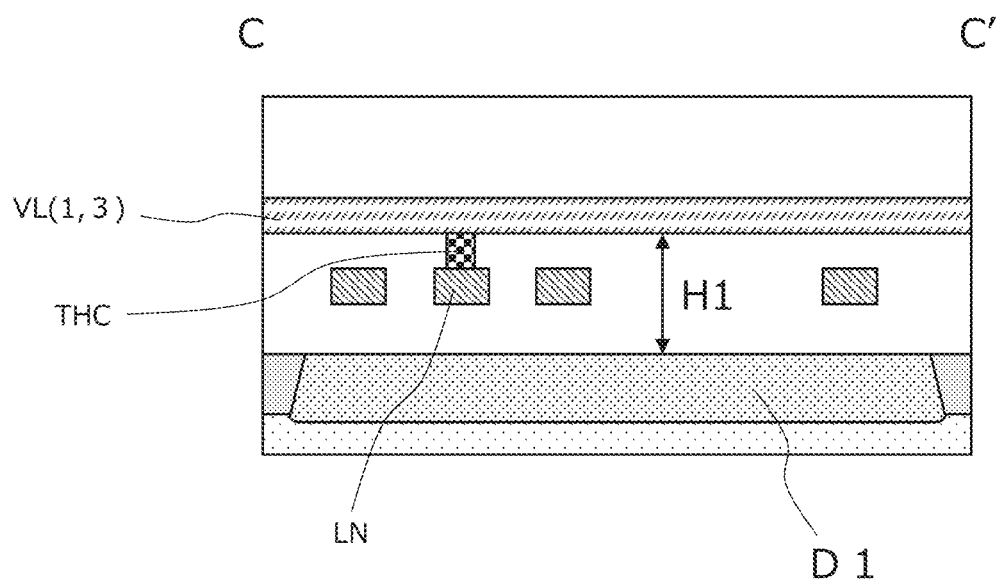
FIG. 9 is a cross-sectional view illustrating a cross section taken along a C-C' line of FIG. 8.

FIG. 9 is a cross-sectional view illustrating a cross section of the semiconductor substrate, taken along a C-C' line of FIG. 8. The drain of the selection transistor TR3 is connected with the vertical signal line VL(1,3) via a leading line LN and a first through hole THC. The leading line LN is formed by the first metal layer M1.

Figure 10:
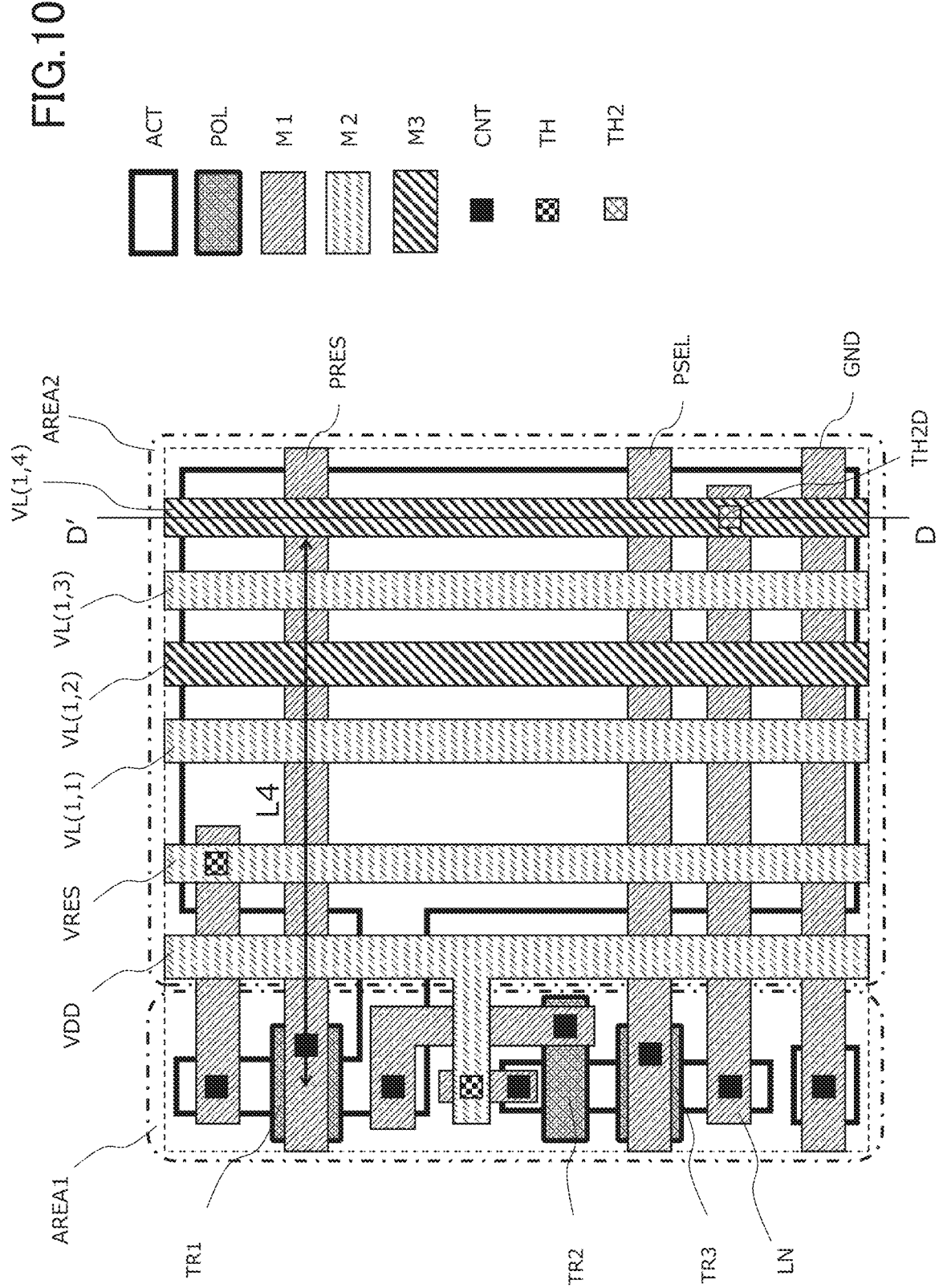
FIG. 10 is a diagram illustrating a fourth pixel layout in which components of a pixel and vertical signal lines are arranged on a semiconductor substrate.

Next, a fourth pixel layout illustrated in FIG. 10 will be described. FIG. 10 illustrates a layout of the pixel P(1,4), the pixel P(1,8), or the pixel P(1,12). In any one of the pixels, the selection transistor TR3 is connected with the vertical signal line VL(1,4).

Figure 11:
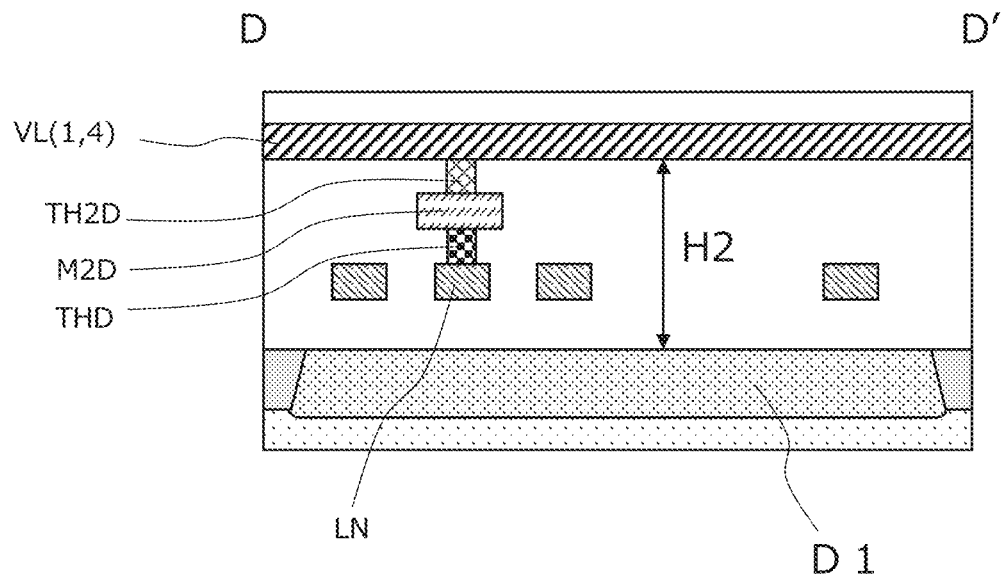
FIG. 11 is a cross-sectional view illustrating a cross section taken along a D-D' line of FIG. 10.

FIG. 11 is a cross-sectional view illustrating a cross section of the semiconductor substrate, taken along a D-D' line of FIG. 10. The drain of the selection transistor TR3 is connected with a second metal layer M2D via a leading line LN and a first through hole THD, and with the vertical signal line VL(1,4) via a second through hole TH2D. The leading line LN is formed by the first metal layer M1.

Deterioration Caused by Radiation

The outline of the sensor deterioration caused by the radiation has already been described. In addition to this, the fluctuation of the analog output signal caused by the deterioration differs depending on the pixel layout. Hereinafter, the specific description thereof will be made, focusing on the difference among the first to the fourth pixel layouts.

In FIG. 4 that illustrates the first pixel layout, the distance from an edge of the vertical signal line VL(1,1) to the center of the channel region of the reset transistor TR1 is a distance L1 indicated by an arrow. In FIG. 6 that illustrates the second pixel layout the distance from an edge of the vertical signal line VL(1,2) to the center of the channel region of the reset transistor TR1 is a distance L2 indicated by an arrow. In FIG. 8 that illustrates the third pixel layout, the distance from an edge of the vertical signal line VL(1,3) to the center of the channel region of the reset transistor TR1 is a distance L3 indicated by an arrow. In FIG. 10 that illustrates the fourth pixel layout, the distance from an edge of the vertical signal line VL(1,4) to the center of the channel region of the reset transistor TR1 is a distance L4 indicated by an arrow.

The distances L1 to L4 are different from each other, and satisfy the relationship of L1<L2<L3<L4. For example, if the common pixel pitch is about a few micrometers, the difference between L1 and L2, between L2 and L3, or between L3 and L4 is about a few hundred nanometers. If the distance between the transistor and the vertical signal line differs as described above, the structure of a connecting portion that connects the leading line LN and the vertical signal line, and that includes a through hole and a metal layer differs. Thus, the electric field applied between the active layer of the transistor and the leading line LN and between the active layer of the transistor and the vertical signal line differs, depending on the vertical signal line. As a result, the analog signal outputted from a pixel after the deterioration caused by radiation will differ, depending on the vertical signal line to which the pixel is connected.

In FIG. 5 that illustrates the first pixel layout and FIG. 9 that illustrates the third pixel layout, the distance between the vertical signal line VL(1,1) or VL(1,3) and the detection diode D1 is a distance H1 indicated by an arrow. In addition, in FIG. 7 that illustrates the second pixel layout and FIG. 11 that illustrates the fourth pixel layout, the distance between the vertical signal line VL(1,2) or VL(1,4) and the detection diode D1 is a distance H2 indicated by an arrow.

The distances H1 and H2 are different from each other, and satisfy the relationship of H1<H2. For example, if the common pixel pitch is about a few micrometers, the film thickness of a wiring layer and the film thickness of insulator between wiring layers are about a few hundred nanometers, and the difference between the distance H1 and the distance H2 is about 0.5 to 1 micrometers. If the metal layer that forms the vertical signal line differs and the distance between the vertical signal line and the detection diode D1 differs as described above, the structure of a connecting portion that connects the leading line LN and the vertical signal line, and that includes a through hole and a metal layer differs. Thus, the electric field applied between the detection diode D1 and the leading line LN and between the detection diode D1 and the vertical signal line differs, depending on the vertical signal line. As a result, the analog signal outputted from a pixel after the deterioration caused by radiation will differ, depending on the vertical signal line to which the pixel is connected.

As described above, if the distance between the vertical signal line and the detection diode differs, and the distance between the vertical signal line and the transistor differs, the electric field produced in the vicinity of the vertical signal line differs. As a result, the pixel characteristics after the deterioration caused by radiation will differ, depending on the pixel layout. Specifically, since the dark current of the detection diode and the leak current of the transistor are changed, the output signal from one pixel connected to one vertical signal line becomes different from the output signal from another pixel connected to another vertical signal line. As to the distances L1 to L4 between the vertical signal line and the transistor and the distances H1 and H2 between the vertical signal line and the detection diode D1, since the electric field increases as the distance decreases, the deterioration caused by the emission of radiation increases as the distance decreases. If the deterioration caused by radiation occurs, the pixel characteristics are changed, by the dark current and the leak current, such that pixels having smaller distances produce larger pixel output.

As described below, in the present embodiment, a reference signal sent to a comparator of an A/D conversion circuit is changed for reducing the difference in pixel output, caused by the difference of the vertical signal line.

Configuration of Readout Circuit

Figure 12:
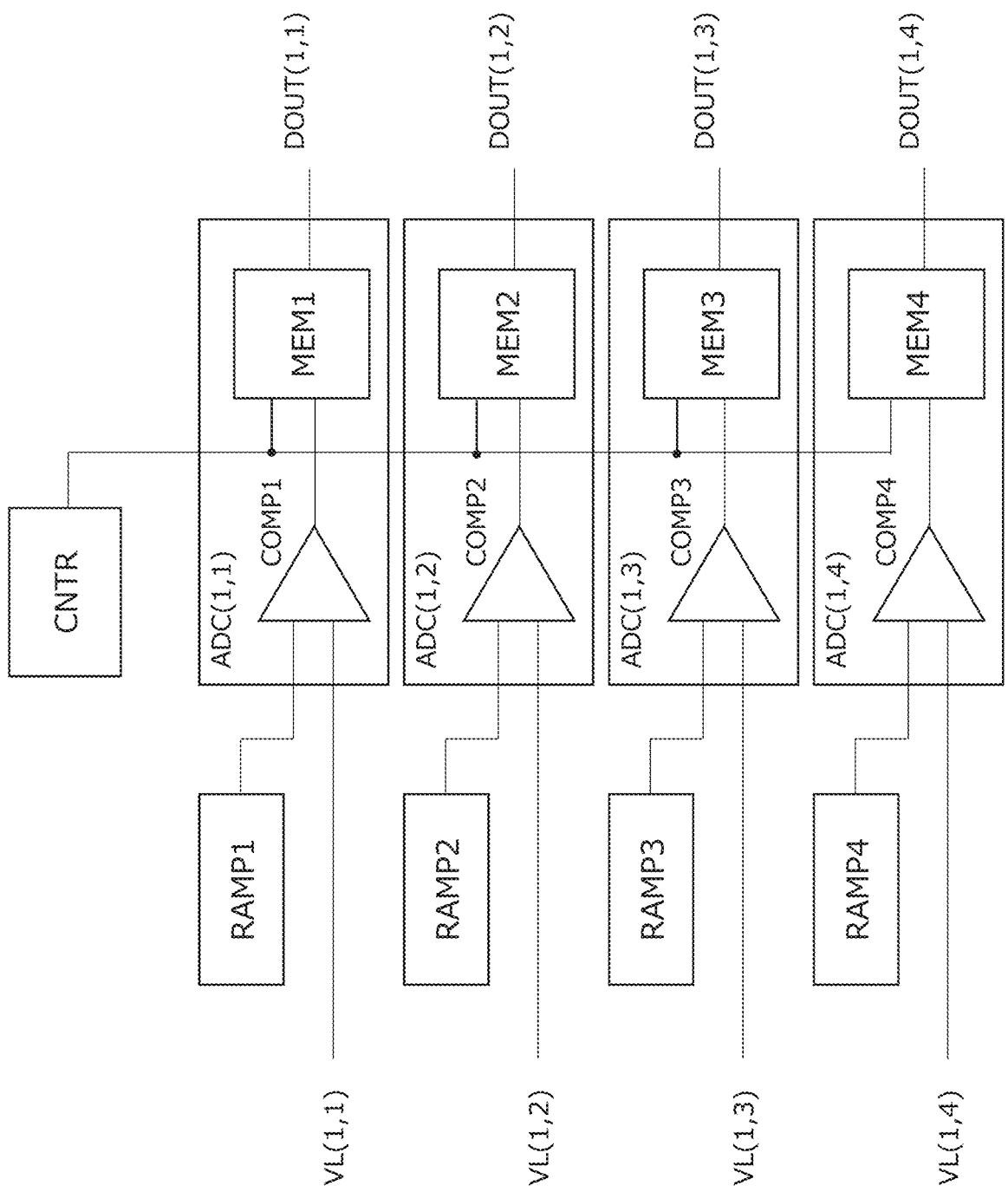
FIG. 12 is a diagram illustrating a portion of a readout circuit of an embodiment.

FIG. 12 is a diagram illustrating a portion of the readout circuit 4 of the present embodiment, and is one example of the readout circuit disposed in the column col(1) of FIG. 3.

The readout circuit of the column col(1) includes an A/D conversion circuit ADC(1,1), an A/D conversion circuit ADC(1,2), an A/D conversion circuit ADC(1,3), and an A/D conversion circuit ADC(1,4). In addition, the readout circuit includes a first ramp-generation portion RAMP1, a second ramp-generation portion RAMP2, a third ramp-generation portion RAMP3, a fourth ramp-generation portion RAMP4, and a counter CNTR. The first to the fourth ramp-generation portions send reference signals to the respective A/D conversion circuits. The counter CNTR sends a count signal to all the A/D conversion circuits.

The A/D conversion circuit ADC(1,1) includes a comparator COMP1 and a memory MEM1. The comparator COMP1 receives a pixel signal from the vertical signal line VL(1,1), and a ramp signal from the first ramp-generation portion RAMP1, as a reference signal. The memory MEM1 receives an output signal (comparison result) from the comparator COMP1, and the count signal from the counter CNTR.

The A/D conversion circuit ADC(1,2) includes a comparator COMP2 and a memory MEM2. The comparator COMP2 receives a pixel signal from the vertical signal line VL(1,2), and a ramp signal from the second ramp-generation portion RAMP2, as a reference signal. The memory MEM2 receives an output signal (comparison result) from the comparator COMP2, and the count signal from the counter CNTR.

The A/D conversion circuit ADC(1,3) includes a comparator COMP3 and a memory MEM3. The comparator COMP3 receives a pixel signal from the vertical signal line VL(1,3), and a ramp signal from the third ramp-generation portion RAMP3, as a reference signal. The memory MEM3 receives an output signal (comparison result) from the comparator COMP3, and the count signal from the counter CNTR The A/D conversion circuit ADC(1,4) includes a comparator COMP4 and a memory MEM4. The comparator COMP4 receives a pixel signal from the vertical signal line VL(1,4), and a ramp signal from the fourth ramp-generation portion RAMP4, as a reference signal. The memory MEM4 receives an output signal (comparison result) from the comparator COMP4, and the count signal from the counter CNTR.

Although not illustrated, the readout circuits of the column col(2) and the column col(3) may have the same configuration as that of the readout circuit of the column col(1). In another case, the first to the fourth ramp-generation portions RAMP1 to RAMP4 and the counter CNTR may be shared by the column col(2) and the column col(3). In this case, the configuration of the system can be simplified.

Each of the comparators COMP1 to COMP4 compares the level of a ramp signal sent from a corresponding one of the first to the fourth ramp-generation portions RAMP1 to RAMP4, with the level of a pixel signal sent from a corresponding vertical signal line. For example, each of the comparators COMP1 to COMP4 outputs a logical value of 0 in a period of time in which the level of the pixel signal is lower than the level of the ramp signal, and outputs a logical value of 1 in a period of time in which the level of the pixel signal is equal to or higher than the level of the ramp signal.

When the comparators COMP1 to COMP4 start to receive the ramp signals from the first to the fourth ramp-generation portions RAMP1 to RAMP4, the counter CNTR starts to count and outputs a count signal. For example, the counter CNTR continues to count until all the comparators COMP1 to COM4 output a logical value of 1. The counter CNTR receives a clock signal (not illustrated) with a predetermined frequency, counts the number of pulses of the clock signal, and outputs the count value as a count signal.

Each of the memories MEM1 to MEM4 holds a count signal from the counter CNTR obtained when the logical value outputted from a corresponding one of the comparators COMP1 to COMP4 becomes 1, and outputs the count signal as a corresponding one of digital signals DOUT 1 to DOUT4. Each of the digital signals DOUT1 to DOUT4 is a digital signal that corresponds to the length of the period of time (the number of pulses of the clock signal) in which the counter CNTR counts until the logical value from a corresponding one of the comparators COMP1 to COMP4 becomes 1.

In the readout circuit having such a configuration, the period of time taken until each of the comparators COMP1 to COMP4 outputs a logical value of 1 is determined, depending on the slope of the ramp signal sent to the comparator, as a reference signal. That is, the gain of each of the A/D conversion circuits can be controlled by controlling the slope of the ramp signal.

In the present embodiment, the slope of the ramp signal sent from a ramp-generation portion to an A/D conversion circuit is controlled, depending on which vertical signal line the A/D conversion circuit is connected to. That is, the gain of the A/D conversion is adjusted by controlling the waveform of the reference signal sent to the A/D conversion circuit, depending on which pixel layout the analog signal is outputted from. In other words, the gain of the A/D conversion is adjusted by controlling the waveform of the reference signal, used for performing the A/D conversion on the analog signal outputted from a pixel, in accordance with the deterioration of the pixel caused by radiation.

Specifically, the slope of the ramp signal outputted from each of the first to the fourth ramp-generation portions RAMP1 to RAMP4 is changed, depending on which vertical signal line the A/D conversion circuit (to which the ramp signal is sent) is connected to. In this manner, the gain of each of the A/D conversion circuits ADC(1,1) to ADC(1,4) can be changed.

Description of Operation

Figure 13:
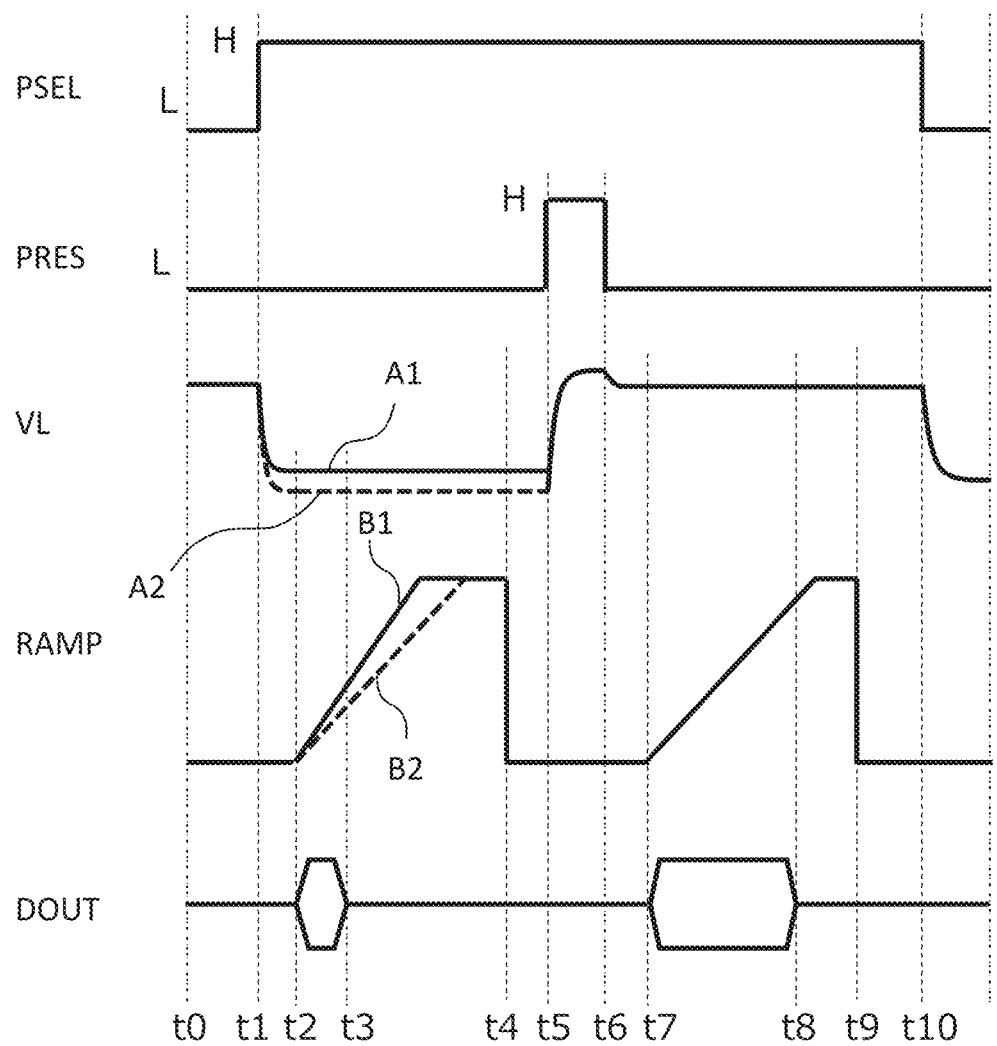
FIG. 13 is an example of a timing chart illustrating operations of a pixel and a readout circuit of an embodiment.

FIG. 13 is an example of a timing chart illustrating operations of the pixel and the readout circuit of the present embodiment. In FIG. 13, the waveform of the selection signal is denoted by PSEL, the waveform of the reset signal is denoted by PRES, the waveform of the electric potential of a vertical signal line that corresponds to the analog signal outputted from a pixel is denoted by VL, and the waveform of a ramp signal outputted from the ramp-generation portion is denoted by RAMP. The digital signal outputted from the A/D conversion circuit is denoted by DOUT, and a length in the horizontal axis (the time axis) indicates the digital value.

A time to is a time at which the electric charge produced by the emission of radiation is being accumulated.

At a time t1, the level of the selection signal PSEL is changed from a low level (L level) to a high level (H level), and the selection transistor TR3 is turned ON. With this operation, the electric potential (S signal) having a pixel signal level that corresponds to the cathode potential of the detection diode D1, in which the electric charge is accumulated, is outputted to the vertical signal line VL via the amplification transistor TR2 and the selection transistor TR3; and sent to the A/D conversion circuit of the readout circuit.

At a time t2, the electric potential of the ramp signal starts to increase, and the counter CNTR starts to count. In the present embodiment, the initial level of the ramp signal is lower than the lower-limit level of the voltage range of the pixel signal, and the level of the ramp signal increases with time, at a constant rate. Note that although the electric potential of the ramp signal increases in the present embodiment, the electric potential of the ramp signal may decrease. If the electric potential of the ramp signal decreases, the initial level of the ramp signal is higher than the upper-limit level of the voltage range of the pixel signal, and the level of the ramp signal decreases with time, at a constant rate.

At a time t3, the level of the ramp signal reaches the level of the vertical-signal-line electric potential (S signal), and the A/D conversion circuit outputs the count signal sent from the counter CNTR at this point of time, as a digital value that represents the level of the S signal.

At a time t4, the ramp signal is reset to the initial level. At a time t5, the level of the reset signal PRES is changed from an L level to an H level, and the reset transistor TR1 is turned ON. With this operation, the cathode of the detection diode D1 is applied with the power supply voltage VRES, and is reset.

At a time t6, the level of the reset signal PRES is changed from the H level to the L level, and the reset transistor TR1 is turned OFF. The electric potential of the cathode of the detection diode D1 decreases slightly, in accordance with the change in the level of the reset signal PRES, from the power supply voltage VRES due to the coupling of parasitic capacitance. With this operation, the electric potential (N signal) having a reference signal level that corresponds to the cathode potential of the detection diode D1, which is reset, is outputted to the vertical signal line VL via the amplification transistor TR2 and the selection transistor TR3; and sent to the A/D conversion circuit of the readout circuit.

At a time t7, the electric potential of the ramp signal starts to increase, and the counter CNTR starts to count. At a time t8, the level of the ramp signal reaches the level of the vertical-signal-line electric potential (N signal), and the A/D conversion circuit outputs the count signal sent from the counter CNTR at this point of time, as a digital value that represents the level of the N signal.

The S signal outputted at the time t3 is stored in memories (e.g., the memories MEM1 to MEM4 illustrated in FIG. 12), and the readout circuit outputs the difference between the level of the S signal and the level of the N signal, as an image signal.

At a time t9, the ramp signal is reset to the initial level. Finally, at a time t10, the level of the selection signal PSEL is changed from the H level to the L level, and the selection transistor TR3 is turned OFF. With this operation, the next accumulation of electric charge is started. When the next accumulation of electric charge is started, the level of the selection signal PSEL is changed to the H level in another pixel. Thus, the electric potential (S signal) of the pixel signal level that corresponds to the electric potential of the cathode of the detection diode D1 of the other pixel is outputted to a corresponding vertical signal line VL.

The operation having been described with reference to FIG. 13 is a reading operation of one cycle that is performed on a pixel of a row. Actually, the reading operation having been described with reference to FIG. 13 is, for example, performed simultaneously on the first row row(1), the second row row(2), the third row row(3), and the fourth row row(4) of the pixel array illustrated in FIG. 3. After that, the same reading operation is performed simultaneously on the fifth row row(5), the sixth row row(6), the seventh row row(7), and the eighth row row(8). And after that, the same reading operation is performed simultaneously on the ninth row row(9), the tenth row row(10), the eleventh row row (11), and the twelfth row row(12). In an embodiment, however, the reading operation may not necessarily be performed simultaneously on a plurality of rows. For example, the reading operation may be performed on each row at a different timing by controlling the reading operation for each row.

A solid line A1 that represents the waveform of the vertical-signal-line electric potential VL in a period of time from the time t1 to the time t5, and a solid line B1 that represents the waveform of the ramp signal RAMP in the period of time from the time t1 to the time t5 are an example of waveforms for a pixel that has smaller deterioration caused by radiation. In contrast, a broken line A2 that represents the waveform of the vertical-signal-line electric potential VL, and a broken line B2 that represents the waveform of the ramp signal RAMP are an example of waveforms for a pixel that has larger deterioration caused by radiation.

For example, in comparison between a pixel connected to the vertical signal line VL(1,1) and a pixel connected to the vertical signal line VL(1,2), the pixel connected to the vertical signal line VL(1,1) has a smaller distance between the vertical signal line and the detection diode, and a smaller distance between the vertical signal line and the transistor. Thus, the pixel connected to the vertical signal line VL(1,1) has larger deterioration caused by radiation. Thus, the pixel connected to the vertical signal line VL(1,1) corresponds to the broken lines A2 and B2, and the pixel connected to the vertical signal line VL(1,2) corresponds to the solid lines A1 and B1.

As described above, the broken line A indicates the vertical-signal-line electric potential of the pixel that has larger deterioration caused by radiation, and the solid line A1 indicates the vertical-signal-line electric potential of the pixel that has smaller deterioration caused by radiation. Thus, the vertical-signal-line electric potential indicated by the broken line A2 is lower than the vertical-signal-line electric potential indicated by the solid line A1 because the dark current of the detection diode and the leak current of the reset transistor are larger in the pixel that has larger deterioration caused by radiation. In this case, for adjusting the gain of the A/D conversion, the slope of the broken line B2, which is the waveform of a ramp signal used for performing the A/D conversion on an output signal from a pixel that has larger deterioration caused by radiation, is made smaller than the slope of the solid line B1, which is the waveform of a ramp signal used for performing the A/D conversion on an output signal from a pixel that has smaller deterioration caused by radiation. With this operation, the digital signal DOUT outputted from the A/D conversion circuit can be corrected so that the influence of the deterioration caused by radiation is canceled in accordance with the level of the deterioration.

In the example illustrated in FIG. 13, the electric potential of the ramp signal increases with time. However, the electric potential of the ramp signal may decrease with time. Also in this case, the correction can be performed for reducing the influence of the deterioration caused by radiation, by adjusting the slope of the waveform of the ramp signal in the same manner.

In addition, in FIG. 12, each of the comparators COMP1 to COMP4 may include a clamp capacitance (not illustrated) connected serially between an input portion of the comparator and a corresponding vertical signal line. In a case where the comparator includes the clamp capacitance, in the operation described with reference to FIG. 13, the difference between the S signal and the N signal may be compared with the level of the ramp signal sent from the ramp-generation portion, and at a timing at which the difference between the S signal and the N signal becomes equal to the level of the ramp signal, the count signal outputted from the counter CNTR may be stored in a memory.

The change in the output signal from a pixel deteriorated by radiation is caused by the dark current of the detection diode and the leak current of the reset transistor, in addition to the electric charge produced by the radiation. Thus, the change in the output signal from the pixel is an offset-based output change. On the other hand, the correction performed in the present embodiment by adjusting the slope of the waveform of the ramp signal is gain correction.

In the radiation detector that counts the number of radiations, a threshold value is set for image data that is obtained, and the 1-bit digital signal from each pixel of the image data is determined as 0 or 1 with respect to the threshold value, for a counting process. Thus, if the slope of the waveform of the ramp signal is adjusted so that the quantization error is reduced in the vicinity of the threshold value, the accuracy of the counting can be improved.

In addition, for setting the slope of the waveform of the ramp signal, the radiation may be emitted, in advance, to pass through an object made of a uniform material, for obtaining image data by receiving the radiation. Then, the difference in the deterioration caused by radiation, caused by the difference in the pixel layout, can be obtained as the change in the image data. Thus, the slope of the waveform of the ramp signal may be set in accordance with the change in the image data, and other image data may be obtained by irradiating an observation object (a desired object) with the radiation.

In the present embodiment, the description has been made for the case where four vertical signal lines are disposed for a single pixel column, and where the readout circuit includes four ramp-generation portions for a single pixel column. However, the number of the vertical signal lines and the number of the ramp-generation portions are not necessarily limited to this example. For example, the readout circuit may include two ramp-generation portions, and one ramp-generation portion may be shared by A/D conversion circuits connected to two vertical signal lines. If the number of vertical signal lines corresponding to a single column is denoted by M and the number of the ramp-generation portions is denoted by N, it is preferable to satisfy the relationship of M=N×n (n: natural number) because the layout can be performed efficiently. In addition, if the number of rows of pixels is denoted by L, it is preferable to satisfy the relationship of L≤M×m (m: natural number) because the layout can be performed efficiently.

The above description has been made for the case where the dark current of the detection diode and the leak current of the reset transistor are changed by the deterioration caused by radiation, decreasing the vertical-signal-line electric potential. However, the present disclosure is also applicable for a case where the vertical-signal-line electric potential is increased by the deterioration. In addition, the present disclosure is also applicable for a case where the driving power of the transistor is changed by the deterioration caused by radiation and the pixel output differs. Furthermore, the present disclosure is also applicable for a case where the parasitic capacitance is changed by the deterioration caused by radiation and the pixel output differs.

In the radiation detector that includes a plurality of vertical signal lines for a single pixel column, even if one pixel and another pixel are disposed in the same pixel column, the distance between the detection diode of the one pixel and a corresponding vertical signal line may be different from the distance between the detection diode of the other pixel and a corresponding vertical signal line. Thus, the deterioration of pixels, including the change in the dark current of the detection diode and the change in the parasitic capacitance, differs. In the present embodiment, however, the slope of the waveform of the ramp signal sent to a comparator connected to a corresponding vertical signal line can be set in accordance with the distance between the detection diode of the pixel connected to the vertical signal line and the vertical signal line. Thus, the difference in pixel output caused by the difference in the distance between the vertical signal line and the detection diode can be reduced. Therefore, it is possible to provide a radiation detector in which the accuracy of the counting is increased.

In addition, in the radiation detector that includes a plurality of vertical signal lines for a single pixel column, even if one pixel and another pixel are disposed in the same pixel column, the distance between the transistor of the one pixel and a corresponding vertical signal line may be different from the distance between the transistor of the other pixel and a corresponding vertical signal line. Thus, the deterioration of pixels, including the change in the leak current of the transistor, the driving power of the transistor, and the change in the parasitic capacitance, differs. In the present embodiment, however, the slope of the waveform of the ramp signal sent to a comparator connected to a corresponding vertical signal line can be set in accordance with the distance between the transistor of the pixel connected to the vertical signal line and the vertical signal line. Thus, the difference in pixel output caused by the difference in the distance between the vertical signal line and the transistor can be reduced. Therefore, it is possible to provide a radiation detector in which the accuracy of the counting is increased.

In addition, in the radiation detector which includes a plurality of vertical signal lines for a single pixel column and in which each vertical signal line is connected with a corresponding comparator, even if one pixel and another pixel are disposed in the same pixel column, the line length from the pixel area of the one pixel to a corresponding comparator may be different from the line length from the pixel area of the other pixel to a corresponding comparator. Thus, the parasitic capacitance and the line resistance differ, so that the response speed of pixel signals differs. In the present embodiment, however, the slope of the waveform of the ramp signal sent to a comparator connected to a corresponding vertical signal line can be set in accordance with the line length from the comparator connected to the vertical signal line to the pixel area. Thus, the difference in pixel output caused by the difference in the line length from the pixel area to the comparator can be reduced. Therefore, it is possible to provide a radiation detector in which the accuracy of the counting is increased.

Specifically, as illustrated in FIG. 3 as an example, the A/D conversion circuits ADC(i,k) are arranged in parallel in a plan view. Thus, even if one pixel and another pixel are disposed in the same pixel column, the distance between the pixel area of the one pixel and a corresponding comparator may be different from the distance between the pixel area of the other pixel and a corresponding comparator. For example, in the first column col(1), the reading operation is performed simultaneously on the pixel P(1,1) of the first row row(1), the pixel P(1,2), the pixel P(1,3), and the pixel P(1,4). The line that connects the pixel P(1,1) and the A/D conversion circuit ADC (1,1) that receives the pixel signal from the pixel P(1,1), the line that connects the pixel P(1,2) and the A/D conversion circuit ADC (1,2) that receives the pixel signal from the pixel P(1,2), the line that connects the pixel P(1,3) and the A/D conversion circuit ADC (1,3) that receives the pixel signal from the pixel P(1,3), and the line that connects the pixel P(1,4) and the A/D conversion circuit ADC (1,4) that receives the pixel signal from the pixel P(1,4) are different in length from each other. The same holds true for other columns and rows. Thus, even if one pixel and another pixel are disposed in the same pixel column, the response in the pixel signal differs because the vertical signal lines VL(1,1), VL(1,2), VL(1,3), and VL(1, 4), which are paths for pixel signals, have different parasitic capacitances and line resistances.

Figure 14:
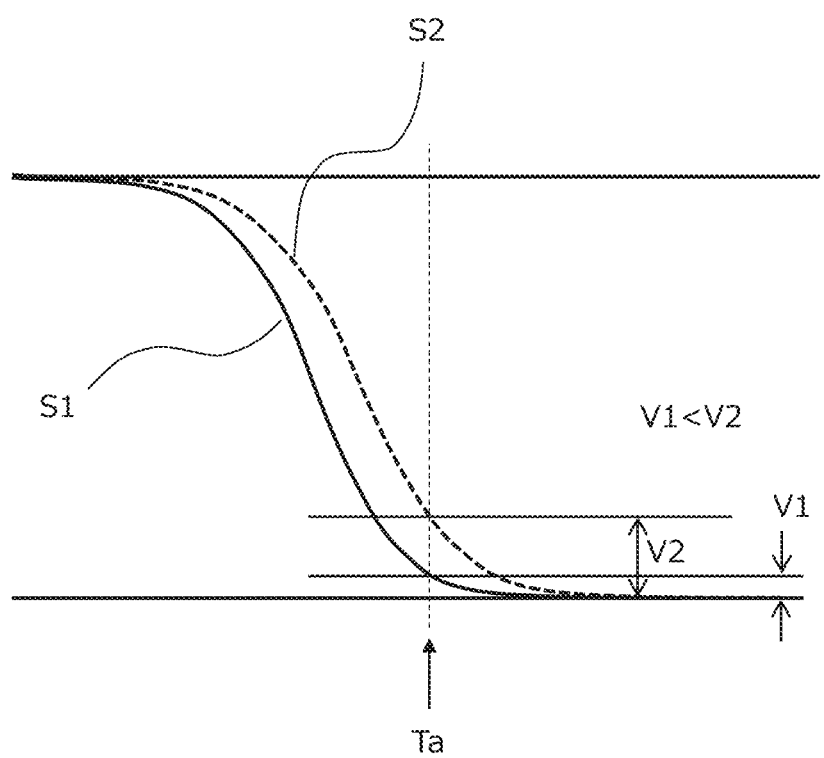
FIG. 14 is a diagram for illustrating a response of a pixel signal.

FIG. 14 is a diagram for illustrating a response of a pixel signal. For example, FIG. 14 illustrates a response of a pixel signal outputted to the vertical signal line VL at or after the time t10, which is illustrated in the timing chart of FIG. 13. The waveform of the response of the pixel signal is obtained when another pixel is selected by the selection signal PSEL and another pixel signal is outputted to a corresponding vertical signal line VL.

A pixel signal S1 is a pixel signal for the vertical signal line VL(1,1), for example. In this case, the distance between the pixel area and the comparator is smaller, and the line for reading the pixel signal is shorter. Thus, the parasitic capacitance and the line resistance have smaller values, and the response of the pixel signal is quick. A pixel signal S2 is a pixel signal for the vertical signal line VL(1,4), for example. In this case, the distance between the pixel area and the comparator is larger, and the line for reading the pixel signal is longer. Thus, the parasitic capacitance and the line resistance have larger values, and the response of the pixel signal is slow. A timing Ta is a timing at which the pixel signal is received by the comparator of the A/D conversion circuit.

In a case where the speed of the reading operation is increased for reducing the count loss, if the parasitic capacitance and the line resistance have larger values, the pixel signal may be received by the comparator before the pixel signal becomes stable. As a result, a level V1 of the pixel signal S1 received by a comparator and a level V2 of the pixel signal S2 received by a comparator become different from each other. In FIG. 14, the level V2 is larger than the level V1, so that the pixel output differs.

If the distance between the pixel area and the comparator is larger, and the line for reading the pixel signal is longer, the parasitic capacitance and the line resistance have larger values, and the electric potential of the pixel signal received by the comparator increases. In this case, it is possible to make correction by increasing the slope of the waveform of the ramp signal, so that the digital signal DOUT outputted from a comparator separated more from a corresponding pixel area is made equal to the digital signal DOUT outputted from a comparator separated less from a corresponding pixel area.

Thus, the difference in pixel output caused by the difference in distance between the pixel area and the comparator can also be reduced by changing the slope of the waveform of the ramp signal. Therefore, it is possible to provide a radiation detector in which the accuracy of the counting is increased.

In the present embodiment the waveform of a ramp signal sent to a corresponding comparator is set for reducing the influence of the sensor deterioration caused by radiation. Preferably, the waveform of a ramp signal is set in consideration of the difference in the line length from a comparator to a corresponding pixel area. In a stage before the influence of the sensor deterioration caused by radiation becomes obvious, that is, in a stage where the influence caused by the difference in the line length from the comparator to the pixel area is dominant, the waveform of the ramp signal that is set based on only the difference in the line length may be used.

In the present embodiment, it is possible to provide a radiation detector which includes a plurality of vertical signal lines and a plurality of A/D conversion portions for a single pixel column, and which outputs a high-precision digital signal in which the influence caused by the difference (between pixels) in the sensor deterioration caused by radiation, and/or the influence caused by the difference in the line length from a pixel area to a corresponding A/D conversion portion are reduced.

Second Embodiment

Figure 15:
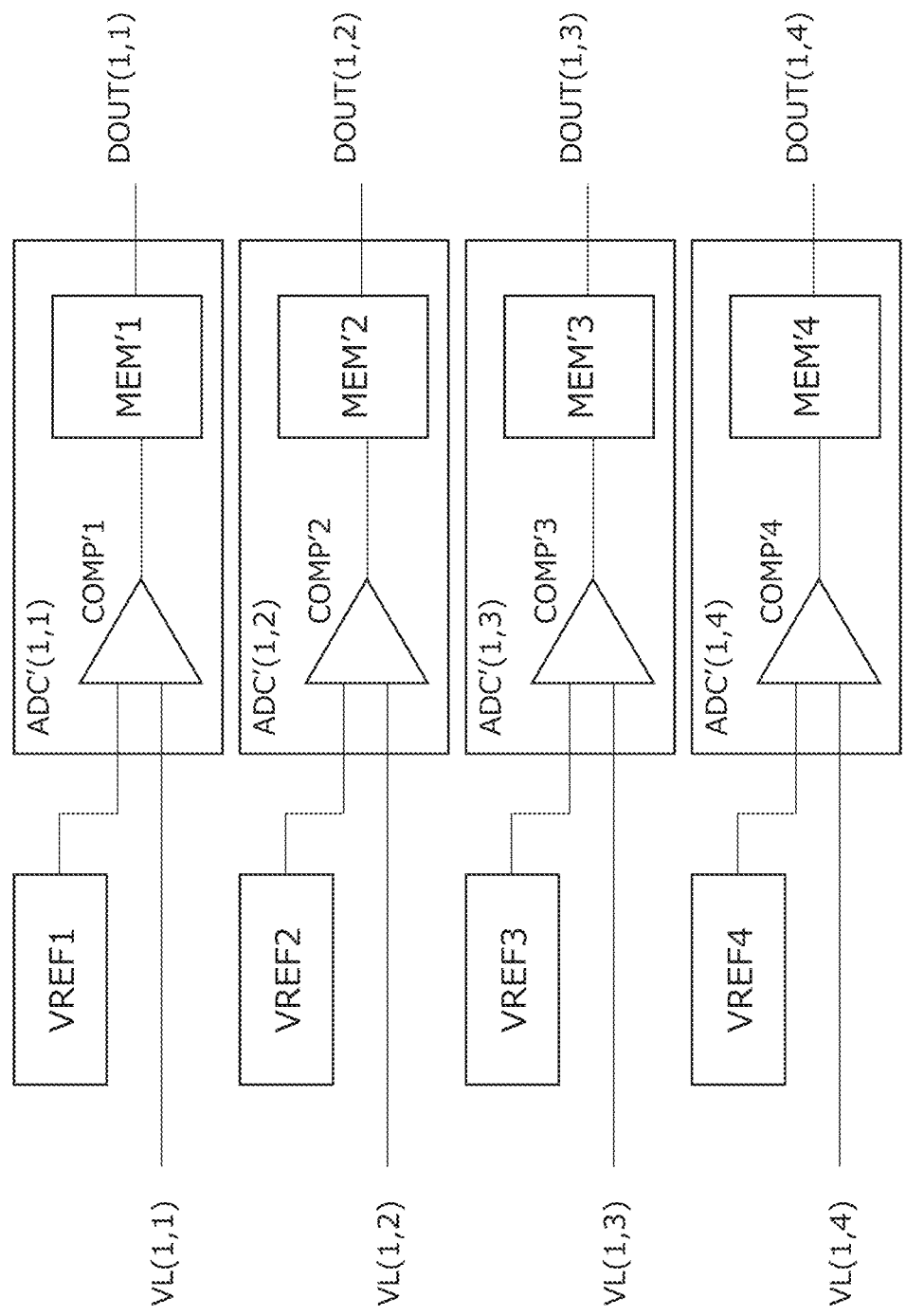
FIG. 15 is a schematic diagram illustrating a configuration of a readout circuit of a radiation detector of a second embodiment.

Next, a radiation detector of a second embodiment will be described with reference to FIG. 15. The description for the same features as those of the first embodiment will be simplified or omitted. The readout circuit of the first embodiment has the configuration illustrated in FIG. 12, but the readout circuit of the present embodiment has the configuration illustrated in FIG. 15. FIG. 15 illustrates a readout circuit for the column col(1) illustrated in FIG. 3.

The readout circuit differs from the readout circuit of the first embodiment in that the output of each of an A/D conversion circuit ADC2(1,1), an A/D conversion circuit ADC2(1,2), an A/D conversion circuit ADC2(1,3), and an A/D conversion circuit ADC2(1,4) is a I-bit digital signal.

Unlike the readout circuit of the first embodiment illustrated in FIG. 12, the readout circuit of the present embodiment does not include the first to the fourth ramp-generation portions RAMP1 to RAMP4 and the counter CNTR. Instead, the readout circuit of the present embodiment includes a first to a fourth reference-voltage-generation portions VREF1 to VREF4, each of which outputs a predetermined constant-voltage signal.

The A/D conversion circuit ADC (1,1) includes a comparator COMP'1 and a memory MEM'1. The comparator COMP'1 receives a pixel signal from the vertical signal line VL(1,1), and a reference voltage from the first reference-voltage-generation portion VREF1, as a reference signal. The memory MEM'1 receives a signal outputted from the comparator COMP'1.

The A/D conversion circuit ADC'(1,2) includes a comparator COMP'2 and a memory MEM'2. The comparator COMP'2 receives a pixel signal from the vertical signal line VL(1,2), and a reference voltage from the second reference-voltage-generation portion VREF2, as a reference signal. The memory MEM'2 receives a signal outputted from the comparator COMP'2.

The A/D conversion circuit ADC'(1,3) includes a comparator COMP'3 and a memory MEM'3. The comparator COMP'3 receives a pixel signal from the vertical signal line VL(1,3), and a reference voltage from the third reference-voltage-generation portion VREF3, as a reference signal. The memory MEM'3 receives a signal outputted from the comparator COMP'3.

The A/D conversion circuit ADC'(1,4) includes a comparator COMP'4 and a memory MEM'4. The comparator COMP'4 receives a pixel signal from the vertical signal line VL(1,4), and a reference voltage from the fourth reference-voltage-generation portion VREF4, as a reference signal. The memory MEM'4 receives a signal outputted from the comparator COMP'4.

Each of the comparators COMP'1 to COMP'4 compares the level of a constant-voltage signal (reference voltage) sent from a corresponding one of the first to the fourth reference-voltage generation portions VREF1 to VREF4, with the level of a pixel signal sent from a corresponding vertical signal line. For example, each of the comparators COMP'1 to COMP'4 outputs a digital value of 0 if the level of the pixel signal is lower than the level of the reference voltage, and outputs a digital value of 1 in a period of time in which the level of the pixel signal is equal to or higher than the level of the reference voltage. The reference voltage is set in consideration of noise so that the comparator outputs a digital value of 1 when the radiation is received, and outputs a digital value of 0) when the radiation is not received.

The 1-bit signal having a digital value of 0 or 1 and outputted from each of the comparators COMP'1 to COMP'4 is stored in a corresponding one of the memories MEM'1 to MEM'4, and then data-transferred to an external apparatus.

Note that although not illustrated in FIG. 15, each of the comparators COMP'1 to COMP'4 may include a clamp capacitance connected serially between an input portion of the comparator and a corresponding vertical signal line. If the comparator includes the clamp capacitance, it is possible to compare the difference between the S signal and the N signal obtained in the operation described with reference to FIG. 13, with the level of the reference voltage sent from corresponding one of the first to the fourth reference-voltage-generation portions VREF1 to VREF4. After that, the 1-bit signal outputted from each of the comparators COMP'1 to COMP'4 may be stored in a corresponding one of the memories MEM'1 to MEM'4.

In the present embodiment, the pixel signal can be converted into a I-bit signal in the radiation detector, by using the reference voltage as a threshold value. Specifically, the pixel signal is converted into a digital value of 1 when the radiation is received, and into a digital value of 0 when the radiation is not received. Since the data outputted from the radiation detector is a I-bit signal, the data capacity can be reduced, and the speed of the reading operation for reading a detection signal from the radiation detector can be increased. As a result, the count loss is reduced, and a radiation detector in which the accuracy of the counting is increased can be provided.

In the readout circuit having such a configuration, whether each of the comparators COMP'1 to COMP'4 outputs a logical value of 1 or 0 depends on the level of the reference voltage received by the comparator. That is, the gain of each of the A/D conversion circuits can be controlled by controlling the level of the reference voltage.

In the present embodiment, the level of the reference voltage sent from a reference-voltage generation portion to an A/D conversion circuit is controlled, depending on which vertical signal line the A/D conversion circuit is connected to. That is, the gain of the A/D conversion is adjusted by controlling the voltage of the reference signal sent to the A/D conversion circuit, depending on which pixel layout the analog signal is outputted from. In other words, the gain of the A/D conversion is adjusted by controlling the voltage of the reference signal, used for performing the A/D conversion on the analog signal outputted from a pixel, in accordance with the deterioration of the pixel caused by radiation.

Specifically, the level of the reference voltage outputted from each of the first to the fourth reference voltage-generation portions VREF1 to VREF4 is changed, depending on which vertical signal line the A/D conversion circuit (to which the reference voltage is outputted) is connected. In this manner, the gain of each of the A/D conversion circuits ADC'(1,1) to ADC'(1,4) can be changed.

The dark current and the leak current in a pixel having larger deterioration caused by radiation are larger than those in a pixel having smaller deterioration caused by radiation.

Thus, the vertical-signal-line electric potential in the pixel having larger deterioration caused by radiation is lower than that in the pixel having smaller deterioration caused by radiation. Thus, the reference voltage sent to the comparator is set lower for a signal from a vertical line connected to a pixel having a pixel layout that causes larger deterioration caused by radiation. In this manner, the correction can be performed for reducing the quantization error produced by the deterioration caused by radiation.

In addition, for setting the level of the reference voltage, the radiation may be emitted, in advance, to pass through an object made of a uniform material, for obtaining image data by receiving the radiation. Then, the difference in the deterioration caused by radiation, caused by the difference in the pixel layout, can be obtained as the change in the image data. Thus, the level of the reference voltage may be set in accordance with the change in the image data, and other image data may be obtained by irradiating an observation object (a desired object) with the radiation.

In the radiation detector that includes a plurality of vertical signal lines for a single pixel column, even if one pixel and another pixel are disposed in the same pixel column, the distance between the detection diode of the one pixel and a corresponding vertical signal line may be different from the distance between the detection diode of the other pixel and a corresponding vertical signal line. Thus, the deterioration of pixels, including the change in the dark current of the detection diode and the change in the parasitic capacitance, differs. In the present embodiment, however, the level of the reference voltage sent to a comparator connected to a corresponding vertical signal line can be set in accordance with the distance between the detection diode of the pixel connected to the vertical signal line and the vertical signal line. Thus, the difference in pixel output caused by the difference in the distance between the vertical signal line and the detection diode can be reduced. Therefore, it is possible to provide a radiation detector in which the accuracy of the counting is increased.

In addition, in the radiation detector that includes a plurality of vertical signal lines for a single pixel column, even if one pixel and another pixel are disposed in the same pixel column, the distance between the transistor of the one pixel and a corresponding vertical signal line may be different from the distance between the transistor of the other pixel and a corresponding vertical signal line. Thus, the deterioration of pixels, including the change in the leak current of the transistor, the driving power of the transistor, and the change in the parasitic capacitance, differs. In the present embodiment, however, the level of the reference voltage sent to a comparator connected to a corresponding vertical signal line can be set in accordance with the distance between the transistor of the pixel connected to the vertical signal line and the vertical signal line. Thus, the difference in pixel output caused by the difference in the distance between the vertical signal line and the transistor can be reduced. Therefore, it is possible to provide a radiation detector in which the accuracy of the counting is increased.

In addition, in the radiation detector which includes a plurality of vertical signal lines for a single pixel column and in which each vertical signal line is connected with a corresponding comparator, even if one pixel and another pixel are disposed in the same pixel column, the line length from the pixel area of the one pixel to a corresponding comparator may be different from the line length from the pixel area of the other pixel to a corresponding comparator. Thus, the parasitic capacitance and the line resistance differ, so that the response speed of pixel signals differs. In the present embodiment, however, the level of the reference voltage sent to a comparator connected to a corresponding vertical signal line can be set in accordance with the line length from the comparator connected to the vertical signal line to the pixel area of a pixel connected to the vertical signal line. For example, the reference voltage sent to a comparator connected with a corresponding pixel area via a longer line can be set higher than the reference voltage sent to a comparator connected with a corresponding pixel area via a shorter line. Thus, the difference in pixel output caused by the difference in the line length from the pixel area to the comparator can be reduced, and the radiation detector in which the accuracy of the counting is increased can be provided.

In the present embodiment, the voltage of a reference signal sent to a corresponding comparator is set for reducing the influence of the sensor deterioration caused by radiation. Preferably, the voltage of a reference signal is set in consideration of the difference in the line length from a comparator to a corresponding pixel area. In a stage before the influence of the sensor deterioration caused by radiation becomes obvious, that is, in a stage where the influence caused by the difference in the line length from the comparator to the pixel area is dominant, the reference signal whose voltage is set based on only the difference in the line length may be used.

In the present embodiment, it is possible to provide a radiation detector which includes a plurality of vertical signal lines and a plurality of A/D conversion portions for a single pixel column, and which outputs a high-precision digital signal in which the influence caused by the difference (between pixels) in the sensor deterioration caused by radiation, and/or the influence caused by the difference in the line length from a pixel area to a corresponding A/D conversion portion are reduced.

Third Embodiment

Figure 16:
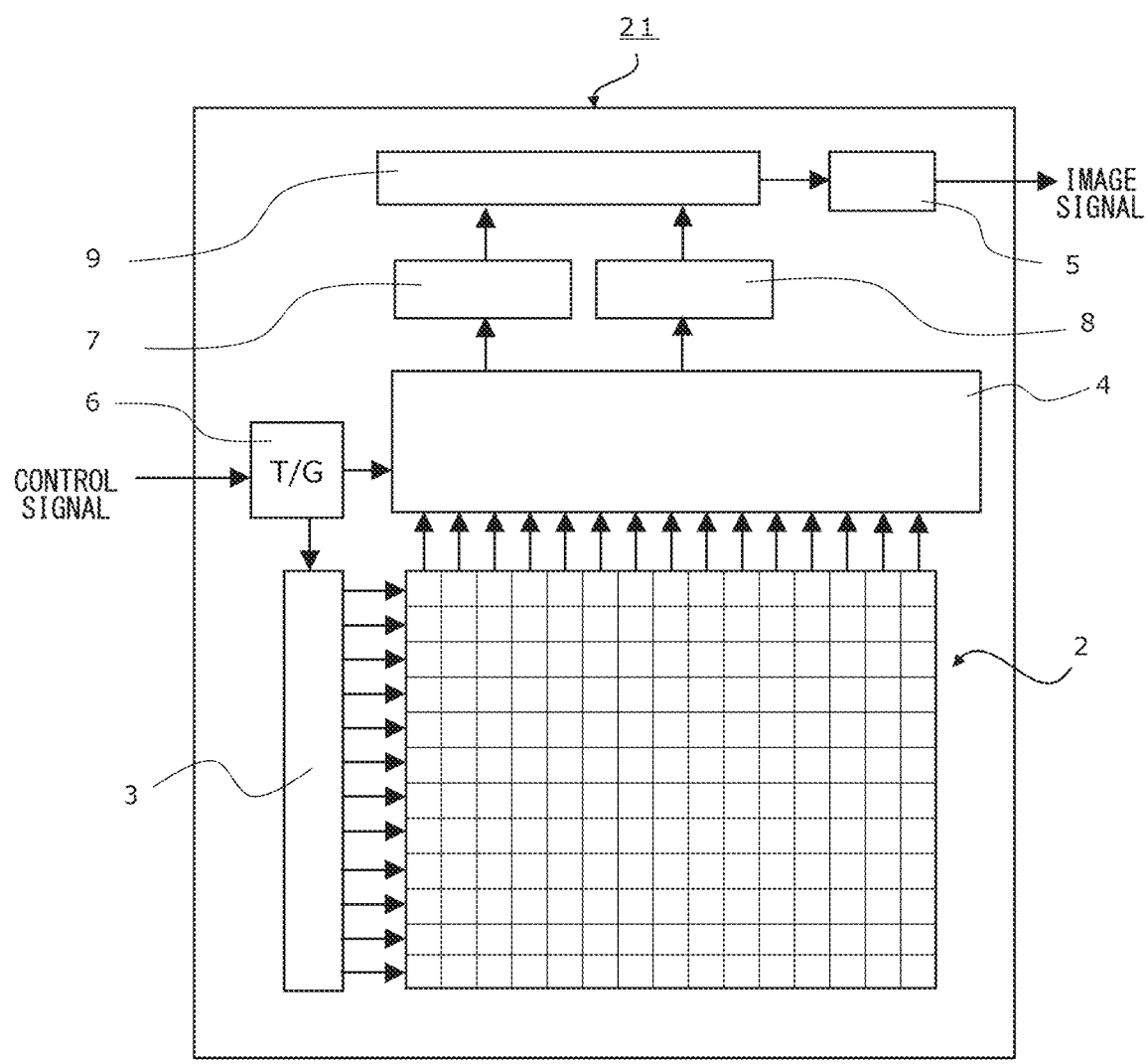
FIG. 16 is a schematic diagram illustrating a configuration of a radiation detector 21 of a third embodiment.

Next, a radiation detector 21 of a third embodiment will be described with reference to FIG. 16. The description for the same features as those of the first embodiment will be simplified or omitted. The radiation detector 21 of the present embodiment differs from the radiation detector 1 of the first embodiment illustrated in FIG. 1, in that the radiation detector 21 includes a first memory 7, a second memory 8, and a signal processing circuit 9. Each of the first memory 7 and the second memory 8 has a size that allows the digitized pixel signal to be stored.

In the present embodiment, an image signal (hereinafter referred to as a first image signal) obtained in a state where the radiation is not emitted, and an image signal (hereinafter referred to as a second image signal) obtained in a state where the radiation is emitted are stored in the memories. Then, the difference between the first image signal and the second image signal is calculated by subtracting the first image signal from the second image signal, so that an image signal (hereinafter referred to as a corrected image signal) in which the increment produced by the deterioration is canceled is obtained. Thus, even if the pixel output increases because the dark current is increased by the deterioration caused by radiation, it is possible to increase the accuracy of the counting.

Hereinafter, the operation of the radiation detector 21 will be described. First, the detection operation is performed in a state where the radiation is not emitted, and the first image signal outputted from the readout circuit 4 is stored in the first memory 7 (first operation).

Then, the detection operation by the radiation detector 21 is performed in a state where the radiation is emitted to an observation object, and the second image signal outputted from the readout circuit 4 is stored in the second memory 8 (second operation).

After that, the signal processing circuit 11 receives the first image signal from the first memory 7, receives the second image signal from the second memory 8, and outputs an image signal obtained by subtracting the first image signal from the second image signal for each pixel (third operation).

If the dark current of the detection diode and the leak current of the transistor increase due to the deterioration caused by radiation, a pixel signal produced by the dark current and the leak current is outputted even in a state where the radiation is not emitted. The level of the outputted pixel signal increases as the deterioration proceeds.

If the radiation is emitted to an observation object and detected after the deterioration occurs, the pixel signal outputted from the pixel is a signal in which the electric charge produced by the radiation is added with the electric charge produced by the dark current and the leak current. In the present embodiment, the electric charge (error-signal component) caused by the dark current and the leak current can be canceled by performing the first to the third operation, and the pixel signal, in which the electric charge caused by the dark current and the leak current is canceled, can be read.

In the radiation detector that includes a plurality of vertical signal lines for a single pixel column, even if one pixel and another pixel are disposed in the same pixel column, the distance between the detection diode of the one pixel and a corresponding vertical signal line may be different from the distance between the detection diode of the other pixel and a corresponding vertical signal line. Thus, the deterioration of pixels, including the change in the dark current of the detection diode and the change in the parasitic capacitance, differs. In the present embodiment, at least in the second operation, the slope of the waveform of a ramp signal sent to a comparator connected to a corresponding vertical signal line can be set in accordance with the distance between the detection diode of the pixel connected to the vertical signal line and the vertical signal line. Thus, the difference in pixel output caused by the difference in the distance between the vertical signal line and the detection diode can be reduced. Therefore, it is possible to provide a radiation detector in which the accuracy of the counting is increased.

In addition, in the radiation detector that includes a plurality of vertical signal lines for a single pixel column, even if one pixel and another pixel are disposed in the same pixel column, the distance between the transistor of the one pixel and a corresponding vertical signal line may be different from the distance between the transistor of the other pixel and a corresponding vertical signal line. Thus, the deterioration of pixels, including the change in the leak current of the transistor, the driving power of the transistor, and the change in the parasitic capacitance, differs. In the present embodiment, at least in the second operation, the slope of the waveform of a ramp signal sent to a comparator connected to a corresponding vertical signal line can be set in accordance with the distance between the transistor of the pixel connected to the vertical signal line and the vertical signal line. Thus, the difference in pixel output caused by the difference in the distance between the vertical signal line and the transistor can be reduced. Therefore, it is possible to provide a radiation detector in which the accuracy of the counting is increased.

In addition, in the radiation detector which includes a plurality of vertical signal lines for a single pixel column and in which each vertical signal line is connected with a corresponding comparator, even if one pixel and another pixel are disposed in the same pixel column, the line length from the pixel area of the one pixel to a corresponding comparator may be different from the line length from the pixel area of the other pixel to a corresponding comparator. Thus, the parasitic capacitance and the line resistance differ, so that the response speed of pixel signals differs. In the present embodiment, in the first and the second operations, the slope of the waveform of a ramp signal sent to a comparator connected to a corresponding vertical signal line can be set in accordance with the line length from the comparator connected to the vertical signal line to the pixel area of a pixel connected to the vertical signal line. Thus, the difference in pixel output caused by the difference in the line length from the pixel area to the comparator can be reduced. Therefore, it is possible to provide a radiation detector in which the accuracy of the counting is increased.

In the first and the second operations, the slope of the waveform of a ramp signal produced by a ramp-generation portion may be fixed, or may be changed. If the slope of the waveform of a ramp signal is fixed, the configuration of the system can be simplified, and the power consumption can be reduced. In contrast, if the slope of the waveform of a ramp signal is changed, the difference in pixel output can be reduced more accurately.

In the present embodiment, even if the pixel output is increased by the increase in the dark current, caused by the deterioration caused by radiation, the increment caused by the deterioration can be canceled by calculating the difference between an image signal obtained in a state where the pixels are irradiated with the radiation, and an image signal obtained in a state where the pixels are not irradiated with the radiation. Therefore, it is possible to provide a radiation detector in which the accuracy of the counting is increased.

Fourth Embodiment

Figure 17:
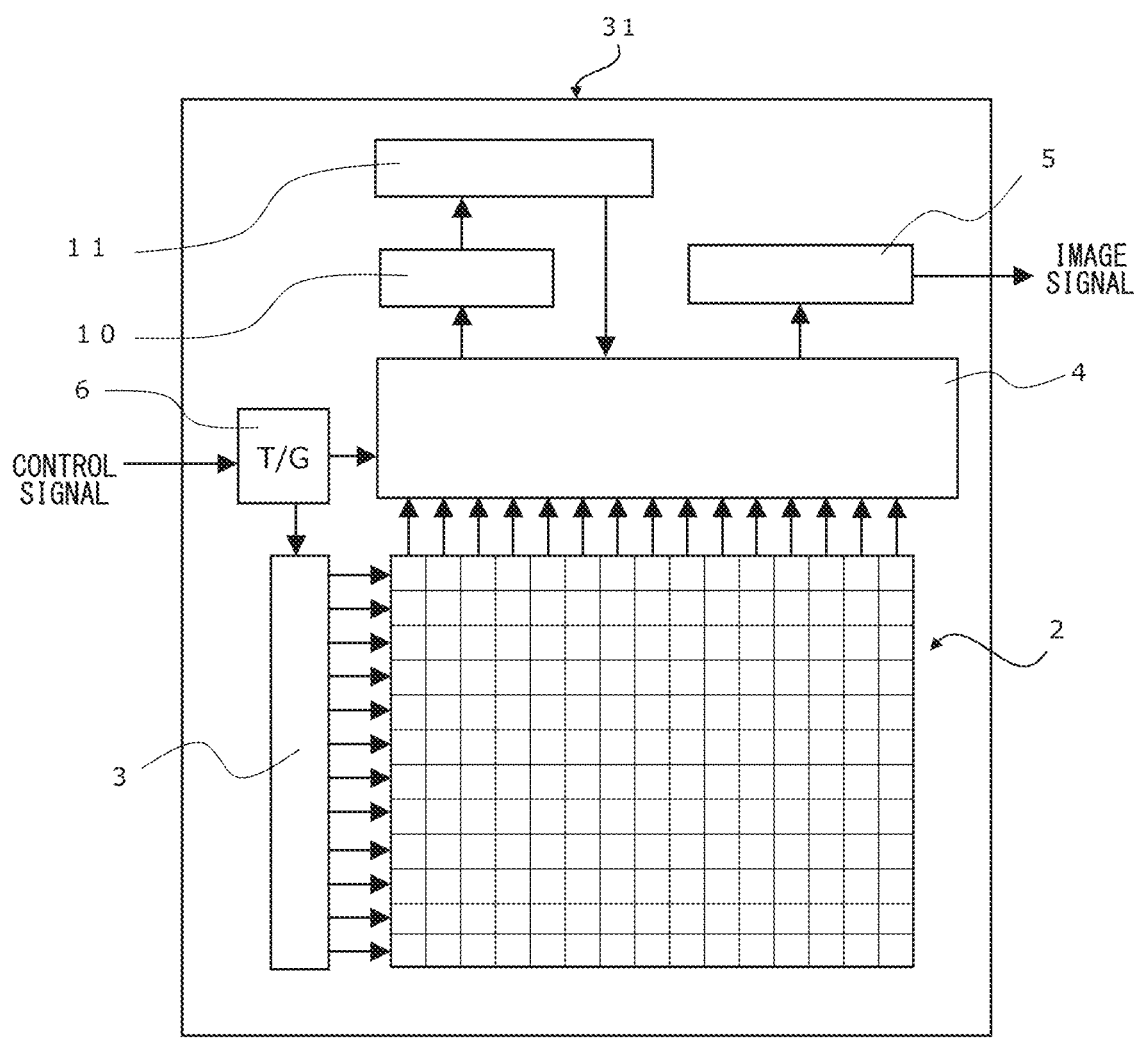
FIG. 17 is a schematic diagram illustrating a configuration of a radiation detector 31 of a fourth embodiment.

Next, a radiation detector 31 of a fourth embodiment will be described with reference to FIG. 17. The description for the same features as those of the first or the second embodiment will be simplified or omitted. The radiation detector 31 of the present embodiment is a modification of the radiation detector of the second embodiment: and differs from the radiation detector 1 illustrated in FIG. 1, in that the radiation detector 31 includes a third memory 10 and a signal processing circuit 11.

The present embodiment solves the problem in which the pixel signal is read as a digital value of 1, even in a state where the radiation is not emitted, because the dark current is increased by the deterioration caused by radiation. Specifically, the number of pixels that output pixel signals whose level are determined as a digital value of 1 even when the radiation is not emitted, is detected in advance. Then, the reference voltage used for binarizing the pixel signal is adjusted before the radiation is emitted and the counting operation is performed. With this operation, the number of pixels that cause the miscount can be reduced even if the pixels deteriorate.

Hereinafter, the operation of the radiation detector 31 will be described.

First, the detection operation is performed in a state where the radiation is not emitted, and a pixel addition signal obtained by adding pixel signals (of pixels) outputted from the readout circuit 4 is stored in the third memory 10 (fourth operation).

Then, the signal processing circuit 11 receives the pixel addition signal from the third memory 10, and determines whether the pixel addition signal is equal to or smaller than a predetermined threshold value (fifth operation). Since the radiation has not been emitted, it is ideal that the predetermined threshold value be zero. However, since the radiation detector may have defective pixels in actuality, the threshold value may not necessarily be zero, and may have a value that is practically acceptable.

If the pixel addition signal is larger than the predetermined value, the reference voltage sent to the A/D conversion circuit of the readout circuit 4 is increased (sixth operation). In the second embodiment, the voltages from the first to the fourth reference-voltage-generation portions VREF1 to VREF4 are set different from each other. In the present embodiment, the reference voltage can be increased by multiplying a preset voltage by a constant ratio. In another case, the reference voltage can be increased by adding a preset voltage with a constant voltage.

The fourth to the sixth operations are repeated until the pixel addition signal becomes equal to or smaller than the predetermined value (seventh operation). If the pixel addition signal is equal to or smaller than the predetermined value, the detection operation by the radiation detector 31 is performed by irradiating an observation object with the radiation, and a binary image signal outputted from the readout circuit 4 is outputted from the signal output circuit 5 (eighth operation).

Thus, in the present embodiment, the fourth to the eighth operations are performed. The fourth to the seventh operations are preparatory operations performed before the detection operation, and the eighth operation is the detection operation performed by emitting the radiation.

In the present embodiment, the set value or the increment of the reference voltage is adjusted, depending on which vertical signal line the A/D conversion portion is connected to.

In the radiation detector that includes a plurality of vertical signal lines for a single pixel column, even if one pixel and another pixel are disposed in the same pixel column, the distance between the detection diode of the one pixel and a corresponding vertical signal line may be different from the distance between the detection diode of the other pixel and a corresponding vertical signal line. Thus, the deterioration of pixels, including the change in the dark current of the detection diode and the change in the parasitic capacitance, differs. In the present embodiment, however, the level of the reference voltage sent to a comparator connected to a corresponding vertical signal line can be set or increased in accordance with the distance between the detection diode of the pixel connected to the vertical signal line and the vertical signal line. Thus, the difference in pixel output caused by the difference in the distance between the vertical signal line and the detection diode can be reduced. Therefore, it is possible to provide a radiation detector in which the accuracy of the counting is increased.

In addition, in the radiation detector that includes a plurality of vertical signal lines for a single pixel column, even if one pixel and another pixel are disposed in the same pixel column, the distance between the transistor of the one pixel and a corresponding vertical signal line may be different from the distance between the transistor of the other pixel and a corresponding vertical signal line. Thus, the deterioration of pixels, including the change in the leak current of the transistor, the driving power of the transistor, and the change in the parasitic capacitance, differs. In the present embodiment, however, the level of the reference voltage sent to a comparator connected to a corresponding vertical signal line can be set or increased in accordance with the distance between the transistor of the pixel connected to the vertical signal line and the vertical signal line. Thus, the difference in pixel output caused by the difference in the distance between the vertical signal line and the transistor can be reduced. Therefore, it is possible to provide a radiation detector in which the accuracy of the counting is increased.

In addition, in the radiation detector which includes a plurality of vertical signal lines for a single pixel column and in which each vertical signal line is connected with a corresponding comparator, even if one pixel and another pixel are disposed in the same pixel column, the line length from the pixel area of the one pixel to a corresponding comparator may be different from the line length from the pixel area of the other pixel to a corresponding comparator. Thus, the parasitic capacitance and the line resistance differ, so that the response speed of pixel signals differs. In the present embodiment, however, the level of the reference voltage sent to a comparator connected to a corresponding vertical signal line can be set or increased in accordance with the line length from the comparator connected to the vertical signal line to the pixel area of a pixel connected to the vertical signal line. Thus, the difference in pixel output caused by the difference in the line length from the pixel area to the comparator can be reduced. Therefore, it is possible to provide a radiation detector in which the accuracy of the counting is increased.

In the present embodiment, it is possible to provide a radiation detector which includes a plurality of vertical signal lines and a plurality of A/D conversion portions for a single pixel column, and which outputs a high-precision digital signal in which the influence caused by the difference (between pixels) in the sensor deterioration caused by radiation, and/or the influence caused by the difference in the line length from a pixel area to a corresponding A/D conversion portion are reduced.

In the present embodiment, even if the dark current increases due to the deterioration caused by radiation, the reference voltage is adjusted before the radiation is emitted and the counting operation is performed. Specifically, the number of pixels that output pixel signals whose levels are determined as a digital value of 1 when the radiation is not emitted, is counted, and the reference voltage is adjusted so that the number of pixels becomes equal to or smaller than a predetermined value. With this operation, the number of pixels that cause the miscount can be reduced even if the pixels are deteriorated by radiation. Therefore, it is possible to provide a radiation detector in which the accuracy of the counting is increased.

Fifth Embodiment

In the above-described embodiments, examples of the configuration of the radiation detector have been described. In the present embodiment, a radiation-image pickup system will be described as an example of a detection system that includes the above-described radiation detector.

Figure 18:
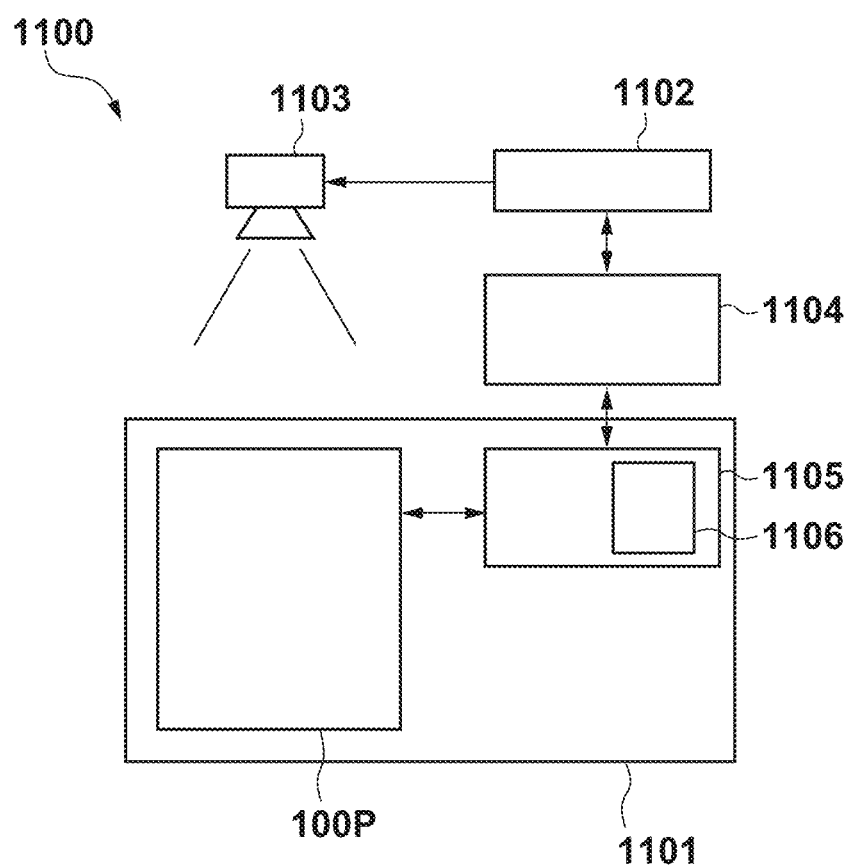
FIG. 18 is a diagram for illustrating a radiation-image pickup system of a fifth embodiment.

A radiation-image pickup system 1100 illustrated in FIG. 18 is a detection system that includes an image pickup portion 1101 that serves as a radiation detector, an irradiation control portion 1102, a radiation source 1103 that serves as an irradiation portion of energy rays, and a computer 1104. The image pickup portion 1101 includes an image pickup panel 100P that includes a pixel array. As the image pickup portion 1101, any one of the radiation detectors described in the first to the fourth embodiments can be used.

The radiation source 1103 starts to emit the radiation, depending on an irradiation command from the irradiation control portion 1102. The radiation emitted from the radiation source 1103 passes through an object whose image is to be picked up (i.e., an object under test), and enters the image pickup panel 100P of the image pickup portion 1101. The radiation source 1103 stops emitting the radiation, depending on a stop command from the irradiation control portion 1102.

For example, the image pickup portion 1101 is a flat-panel detector used for the radiation imaging in medical diagnostic imaging or non-destructive testing. The image pickup panel 100P of the image pickup portion 1101 may be formed like a plate, and may have a size that corresponds to the size of an object whose image is to be picked up. For example, in the image pickup panel 100P, pixels of 3300×2800 are disposed on a substrate with a size of 550 mm×445 mm. The image pickup portion 1101 may have a direct-conversion-type configuration in which a detection diode disposed in the pixel array of the image pickup panel 100P converts the radiation into an electric-charge signal.

The image pickup portion 1101 includes the above-described image pickup panel 100P, a control portion 1105 that controls the image pickup panel 100P, and a signal processing portion 1106 that processes a signal outputted from the image pickup panel 100P. For example, the signal processing portion 1106 may perform A/D conversion on a signal outputted from the image pickup panel 100P, and output the converted signal to the computer 1104, as digital image data. In addition, the signal processing portion 1106 may create a stop signal that stops the emission of the radiation from the radiation source 1103, depending on a signal outputted from the image pickup panel 100P. The stop signal is sent to the irradiation control portion 1102 via the computer 1104; and the irradiation control portion 1102 sends a stop command to the radiation source 1103, in response to the stop signal.

The control portion 1105 may be a programmable logic device (PLD), such as a field programmable gate array (FPGA), an application specific integrated circuit (ASIC), a general-purpose computer in which a program is embedded, or a combination of part or all of the above-described components.

In the present embodiment, as illustrated in FIG. 18, the signal processing portion 1106 is disposed in the control portion 1105, or is a function of the control portion 1105. However, the present disclosure is not limited to this. The control portion 1105 and the signal processing portion 1106 may be separated from each other. In another case, the signal processing portion 1106 may be separated from the image pickup portion 1101. For example, the computer 1104 may have the function of the signal processing portion 1106. In this case, the signal processing portion 1106 is included in the radiation-image pickup system 1100, as a signal processing apparatus that processes a signal outputted from the image pickup portion 1101.

The computer 1104 controls the image pickup portion 1101 and the irradiation control portion 1102, and receives radiation image data from the image pickup portion 1101 and displays the radiation image data, as a radiation image.

In addition, the computer 1104 serves also as an input portion for a user to input a condition for picking up a radiation image.

As an example, the irradiation control portion 1102 includes an irradiation switch. If the irradiation switch is turned ON by a user, the irradiation control portion 1102 sends an irradiation command to the radiation source 1103, and sends a start notification, which indicates the start of emission of the radiation, to the computer 1104. The computer 1104 receives the start notification; and notifies the control portion 1105 of the image pickup portion 1101, of the start of emission of the radiation, in response to the start notification. In response to this, the control portion 1105 causes the image pickup panel 100P to produce a signal that corresponds to the incident radiation.

Sixth Embodiment

Figure 19A:
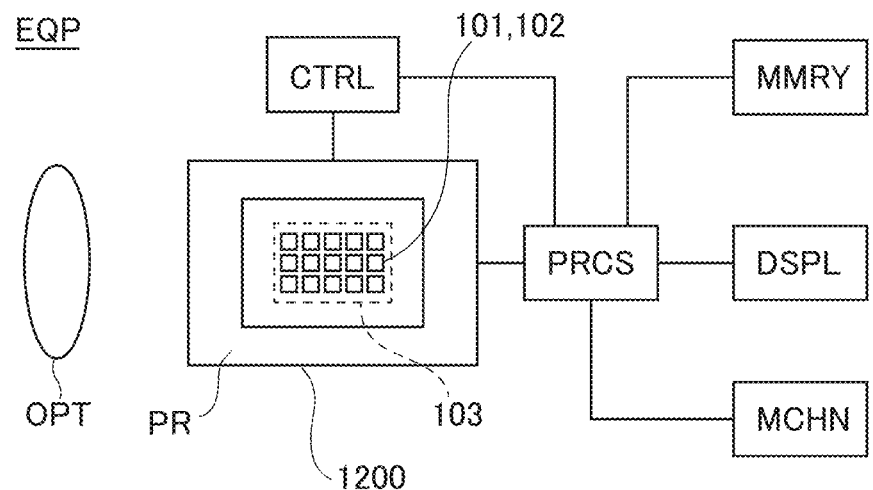
FIG. 19A is a diagram illustrating a detection system of a sixth embodiment that includes a radiation detector.

In the present embodiment, another example of the detection system, which includes any one of the radiation detectors of the first to the fourth embodiments, will be described. FIG. 19A illustrates an apparatus EQP that serves as a detection system that includes a radiation detector 1200.

The radiation detector 1200 includes a pixel array 103 in which pixels are arranged in a matrix, and a peripheral area PR which is formed around the pixel array 103. In the peripheral area PR, a peripheral circuit (e.g., a vertical scanning circuit and a column-circuit portion) can be disposed.

The apparatus EQP may further include at least one of an optical system OPT, a control apparatus CTRL, a processing apparatus PRCS, a display apparatus DSPL, a memory apparatus MMRY, and a machine apparatus MCHN. The optical system OPT focuses the radiation on the radiation detector 1200, and includes a lens, a shutter, and a mirror. The optical system OPT may focus a particle ray, such as an electron beam or a proton beam, on the radiation detector 1200, depending on a type of the radiation. The control apparatus CTRL controls the radiation detector 1200, and may be an ASIC. The processing apparatus PRCS processes a signal outputted from the radiation detector 1200, and is an apparatus, such as a CPU or ASIC, that constitutes an analog front end (AFE) or a digital front end (DFE). The display apparatus DSPL may be an EL display apparatus or a liquid-crystal-display apparatus that displays information obtained by the radiation detector 1200, in a format such as a visible image. The memory apparatus MMRY may be a magnetic device or a semiconductor device that stores the information obtained by the radiation detector 1200. The memory apparatus MMRY may be a volatile memory, such as an SRAM or a DRAM, or may be a nonvolatile memory, such as a flash memory or a hard-disk drive. The machine apparatus MCHN includes a movable portion or a propulsive portion, such as a motor or an engine.

The apparatus EQP causes the display apparatus DSPL to display a signal outputted from the radiation detector 1200, and causes a communication apparatus (not illustrated) included in the apparatus EQP to send the signal to an external apparatus. Thus, it is preferable that the apparatus EQP include the memory apparatus MMRY and the processing apparatus PRCS, apart from a memory circuit and a computing circuit included in the radiation detector 1200. The machine apparatus MCHN may be controlled, depending on a signal outputted from the radiation detector 1200.

The apparatus EQP illustrated in FIG. 19A may be a medical apparatus such as an endoscope or a radiation diagnostic apparatus, a measuring apparatus such as a range sensor, or an analytical apparatus such as an electron microscope.

Figure 19B:
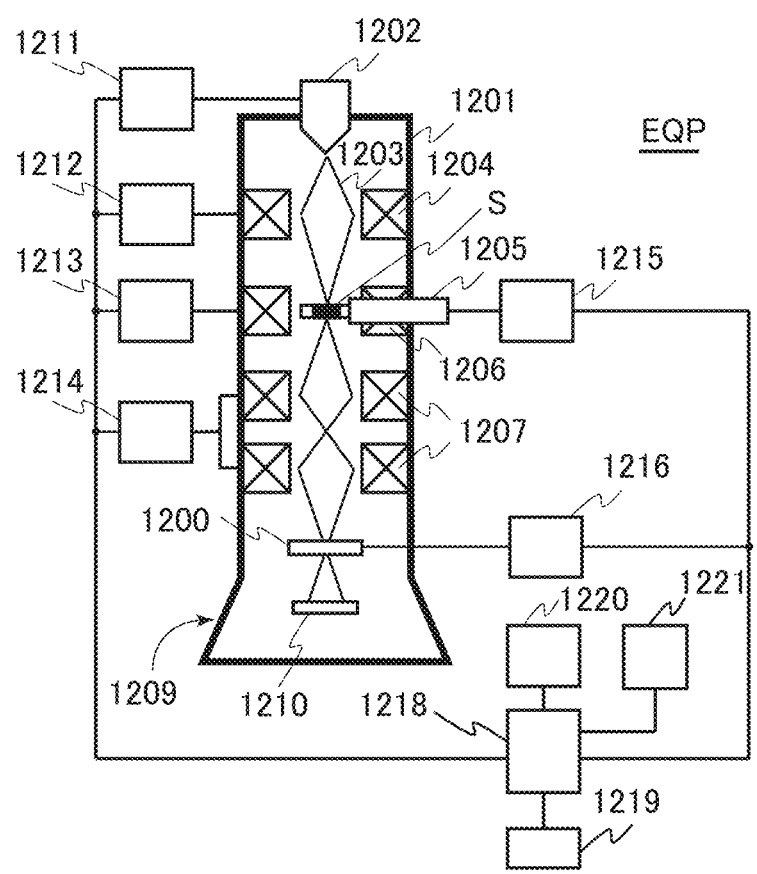
FIG. 19B is a diagram illustrating an apparatus of the sixth embodiment that includes the radiation detector.

FIG. 19B is a schematic diagram illustrating a configuration of a transmission electron microscope (TEM), as an example of the apparatus EQP. The apparatus EQP, which serves as an electron microscope, includes an electron beam source (electron gun) 1202 that serves as an irradiation portion of the energy ray (electron beam), an irradiation lens 1204, a vacuum chamber (lens barrel) 1201, an objective lens 1206, and a magnifying lens system 1207. In addition, the apparatus EQP also includes a camera 1209 that serves as an image pickup portion. The camera 1209 includes a direct-detection-type radiation detector 1200.

The electron beam 1203, which is the energy ray emitted from the electron beam source 1202, is focused on a sample S, which is an object to be analyzed, by the irradiation lens 1204. The sample S is held by a sample holder, and is irradiated with the electron beam. The space through which the electron beam 1203 passes is defined by the vacuum chamber (lens barrel) 1201, and is kept as a vacuum. The radiation detector 1200 is disposed so as to face the vacuum space, through which the electron beam 1203 passes. The electron beam 1203 that has passed through the sample S is expanded by the objective lens 1206 and the magnifying lens system 1207, and is projected on the radiation detector 1200. The electron optical system for irradiating the sample S with the electron beam is referred to as an irradiation optical system; and an electron optical system for focusing the electron beam having passed through the sample S, on the radiation detector 1200 is referred to as a focusing optical system.

The electron beam source 1202 is controlled by an electron-beam-source control apparatus 1211. The irradiation lens 1204 is controlled by an irradiation-lens control apparatus 1212. The objective lens 1206 is controlled by an objective-lens control apparatus 1213. The magnifying lens system 1207 is controlled by a magnifying-lens-system control apparatus 1214. A control mechanism 1205 of the sample holder is controlled by a holder control apparatus 1215 that controls the driving mechanism of the sample holder.

The electron beam 1203 that has passed through the sample S is detected by the radiation detector 1200 of the camera 1209. The output signal from the radiation detector 1200 is processed by a signal processing apparatus 1216 and an image processing apparatus 1218, which serve as the processing apparatus PRCS, so that an image signal is produced. The produced image signal (transmission electron image) is displayed on an image display monitor 1220 and an analysis monitor 1221, which serves as the display apparatus DSPL.

The camera 1209 is disposed in a lower portion of the apparatus EQP. The camera 1209 includes the radiation detector 1200 that directly converts an electron beam into an electric-charge signal. The radiation detector 1200 serves as an image pickup element 100. At least one portion of the camera 1209 is disposed in the camera 1209, so as to be exposed to the vacuum space formed by the vacuum chamber 1201. The electron beam 1203 that has passed through the radiation detector 1200 is absorbed by an electron-beam absorbing member 1210 that is, for example, a substrate of a package. The camera 1209 may be detachably attached to the vacuum chamber 1201. If it becomes necessary to replace the radiation detector 1200 with another radiation detector, the camera 1209 can be detached from the vacuum chamber 1201 and replaced with a new camera. For replacing the camera 1209 with a new camera without breaking the vacuum state, a vacuum partition that can be opened and closed may be disposed between the camera 1209 and the vacuum chamber 1201.

Each of the electron-beam-source control apparatus 1211, the irradiation-lens control apparatus 1212, the objective-lens control apparatus 1213, the magnifying-lens-system control apparatus 1214, and the holder control apparatus 1215 is connected with the image processing apparatus 1218. Thus, each of the above-described components and the image processing apparatus 1218 can exchange data with each other for setting the image-pickup condition of the electron microscope. In this case, the electron-beam-source control apparatus 1211 and the image processing apparatus 1218 function as a control portion that controls the irradiation rate of the radiation. The control of driving the sample holder and the observation condition for each lens can be set by using a signal from the image processing apparatus 1218.

An operator prepares the sample S whose image is to be picked up, and sets an image-pickup condition by using an input apparatus 1219 connected to the image processing apparatus 1218. The operator inputs necessary data into each of the electron-beam-source control apparatus 1211, the irradiation-lens control apparatus 1212, the objective-lens control apparatus 1213, and the magnifying-lens-system control apparatus 1214, and thereby obtains desired acceleration voltage, magnification, and observation mode. In addition, the operator inputs conditions, such as the number of continuous field images, a start position for picking up an image, and a moving speed of the sample holder, into the image processing apparatus 1218 by using the input apparatus 1219, which is a mouse, a keyboard, a touch panel, or the like. Instead of the input from an operator, the image processing apparatus 1218 may automatically set the conditions.

The detection system described in the fifth and the sixth embodiments are merely examples. Thus, a radiation detector described in the first to the fourth embodiments may be used in another detection system.

Note that the present disclosure is not limited to the above-described embodiments, and can be variously modified within the technical concept of the present disclosure. For example, some or all of the above-described different embodiments may be combined with each other, and the combination may be embodied.

The radiation detector to which the present disclosure can be applied is not limited to a radiation detector that has a specific configuration. For example, the light receiving portion that receives the radiation may be any one of the front-side illumination type and the back-side illumination type. In addition, the radiation detector may be a laminated radiation detector in which a semiconductor chip including a light receiving portion and a semiconductor chip including a logic portion are laminated on each other.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-200560, filed Dec. 15, 2022 which is hereby incorporated by reference herein in its entirety:

What is claimed is:

1. A radiation detector comprising:
a plurality of pixels disposed in a pixel area and including a first pixel and a second pixel disposed in a same column, the plurality of pixels being disposed in a matrix and each of the plurality of pixels including a conversion portion configured to directly convert radiation to electric charge;
a first comparator connected with the first pixel via a first vertical signal line; and
a second comparator connected with the second pixel via a second vertical signal line,
wherein a first distance from the conversion portion of the first pixel to the first vertical signal line is different from a second distance from the conversion portion of the second pixel to the second vertical signal line,
wherein the first comparator is configured to receive a first reference signal and compare the first reference signal with an output signal sent from the first pixel to the first comparator via the first vertical signal line,
wherein the second comparator is configured to receive a second reference signal and compare the second reference signal with an output signal sent from the second pixel to the second comparator via the second vertical signal line, the second reference signal being different from the first reference signal, and
wherein the radiation detector is configured to output a comparison result from each of the first comparator and the second comparator.

2. The radiation detector according to claim 1, wherein the first reference signal and the second reference signal are ramp signals whose slopes are different from each other.

3. The radiation detector according to claim 2, wherein the first distance is larger than the second distance and the slope of the second reference signal is larger than the slope of the first reference signal.

4. The radiation detector according to claim 2, wherein a third distance from the pixel area to the first comparator in the first vertical signal line is larger than a fourth distance from the pixel area to the second comparator in the second vertical signal line and the slope of the first reference signal is larger than the slope of the second reference signal.

5. The radiation detector according to claim 1, wherein the first reference signal and the second reference signal are constant-voltage signals whose voltages are different from each other.

6. The radiation detector according to claim 5, wherein the first distance is larger than the second distance and the voltage of the second reference signal is larger than the voltage of the first reference signal.

7. The radiation detector according to claim 5, wherein a third distance from the pixel area to the first comparator in the first vertical signal line is larger than a fourth distance from the pixel area to the second comparator in the second vertical signal line and the voltage of the first reference signal is larger than the voltage of the second reference signal.

8. A method of driving the radiation detector according to claim 6, the method comprising:
obtaining comparison results from the first comparator and the second comparator before radiation is emitted;
correcting a voltage of a reference signal sent to a comparator if the comparator has outputted a comparison result indicating that an output signal sent from a pixel to the comparator via a vertical signal line is larger than the reference signal, the correcting being performed such that the voltage of the reference signal sent to the comparator becomes larger than the output signal sent from the pixel to the comparator via the vertical signal line before the radiation is emitted; and sending a corrected reference signal to the comparator in a case where the radiation is emitted, and outputting comparison results from the first comparator and the second comparator.

9. The radiation detector according to claim 1, further comprising a first signal-generation portion configured to generate the first reference signal and a second signal-generation portion configured to generate the second reference signal.

10. A method of driving the radiation detector according to claim 1, the method comprising:

storing an output signal from each of the first comparator and the second comparator before emitting radiation, the output signal being stored as first data; and subtracting the first data from an output signal outputted from the first comparator and the second comparator in a case where the radiation is emitted, and outputting data obtained by performing the subtracting.

11. A method of driving the radiation detector according to claim 1, the method comprising:

obtaining comparison results from the first comparator and the second comparator by using the first reference signal and the second reference signal before radiation is emitted;

correcting the first reference signal and the second reference signal, based on the comparison results; and outputting comparison results from the first comparator and the second comparator by using the first reference signal corrected in the correcting and the second reference signal corrected in the correcting, in a case where the radiation is emitted.

12. A radiation-image pickup system comprising:

a radiation source configured to emit a radiation to an object whose image is to be picked up; and the radiation detector according to claim 1.

13. A radiation detector comprising:

a plurality of pixels disposed in a pixel area and including a first pixel and a second pixel disposed in a same column, the plurality of pixels being disposed in a matrix and each of the plurality of pixels including a conversion portion configured to directly convert radiation to electric charge and a transistor;

a first comparator connected with the first pixel via a first vertical signal line; and a second comparator connected with the second pixel via a second vertical signal line, wherein a first distance from the transistor of the first pixel to the first vertical signal line is different from a second distance from the transistor of the second pixel to the second vertical signal line, wherein the first comparator is configured to receive a first reference signal and compare the first reference signal with an output signal sent from the first pixel to the first comparator via the first vertical signal line, wherein the second comparator is configured to receive a second reference signal and compare the second reference signal with an output signal sent from the second pixel to the second comparator via the second vertical signal line, the second reference signal being different from the first reference signal, and wherein the radiation detector is configured to output a comparison result from each of the first comparator and the second comparator.

14. A radiation detector comprising:

a plurality of pixels disposed in a pixel area and including a first pixel and a second pixel disposed in a same column, the plurality of pixels being disposed in a matrix and each of the plurality of pixels including a conversion portion configured to directly convert radiation to electric charge and a transistor;

a first comparator connected with the first pixel via a first vertical signal line; and a second comparator connected with the second pixel via a second vertical signal line, wherein a distance from the pixel area to the first comparator in the first vertical signal line is different from a distance from the pixel area to the second comparator in the second vertical signal line, wherein the first comparator is configured to receive a constant-voltage signal as a first reference signal and compare the first reference signal with an output signal sent from the first pixel to the first comparator via the first vertical signal line, wherein the second comparator is configured to receive a constant-voltage signal as a second reference signal and compare the second reference signal with an output signal sent from the second pixel to the second comparator via the second vertical signal line, voltage of the second reference signal being different from voltage of the first reference signal, and wherein the radiation detector is configured to output a comparison result from each of the first comparator and the second comparator.

\* \* \* \* \*